(12) United States Patent
An et al.

(10) Patent No.: US 10,880,306 B2
(45) Date of Patent: Dec. 29, 2020

(54) VERIFICATION INFORMATION UPDATE

(71) Applicant: Alibaba Group Holding Limited, Grand Cayman (KY)

(72) Inventors: Qing An, Zhejiang (CN); Kepeng Li, Zhejiang (CN)

(73) Assignee: Alibaba Group Holding Limited, Grand Cayman (KY)

( * ) Notice: Subject to any disclaimer, the term of this patent is extended or adjusted under 35 U.S.C. 154(b) by 295 days.

(21) Appl. No.: 15/906,996

(22) Filed: Feb. 27, 2018

(65) Prior Publication Data
US 2018/0191504 A1 Jul. 5, 2018

Related U.S. Application Data

(63) Continuation of application No. PCT/CN2016/095858, filed on Aug. 18, 2016.

(30) Foreign Application Priority Data

Aug. 31, 2015 (CN) .......................... 2015 1 0549437

(51) Int. Cl.
*G06F 21/45* (2013.01)
*H04L 9/12* (2006.01)
(Continued)

(52) U.S. Cl.
CPC ........ *H04L 63/0876* (2013.01); *H04L 9/3242* (2013.01); *H04L 29/06* (2013.01);
(Continued)

(58) Field of Classification Search
None
See application file for complete search history.

(56) References Cited

U.S. PATENT DOCUMENTS 8,205,076 B1 6/2012 Shetty et al.
9,009,805 B1 4/2015 Kirkby et al.
(Continued)

FOREIGN PATENT DOCUMENTS

CN 102307193 A 1/2012
CN 202634464 12/2012
(Continued)

OTHER PUBLICATIONS

Persistent Naming for P2P Web Hosting. Bari et al.IEEE. (Year: 2011).*

(Continued)

*Primary Examiner* — Venkat Perungavoor
(74) *Attorney, Agent, or Firm* — Lee & Hayes, P.C.

(57) ABSTRACT

A verification information update method includes: receiving a first request message for binding to a smart device from a terminal device, the first request message carrying a universally unique identifier (UUID) of the smart device; determining a binding relationship between the UUID and a user identifier of the terminal device, and generating a session random number corresponding to the binding relationship; and generating a new verification number and a new verification password of the smart device based on the session random number. The technical solution of the present disclosure implement dynamic update of verification information during a session, thus increasing the difficulty in monitoring the verification information during update.

17 Claims, 19 Drawing Sheets

(51) Int. Cl.
  *H04L 29/06* (2006.01)
  *H04W 12/04* (2009.01)
  *H04W 12/06* (2009.01)
  *H04W 4/70* (2018.01)
  *H04L 9/32* (2006.01)
  *H04L 7/10* (2006.01)
  *H04L 29/08* (2006.01)

(52) U.S. Cl.
  CPC ......... *H04W 4/70* (2018.02); *H04W 12/0401* (2019.01); *H04W 12/0602* (2019.01); *H04W 12/0608* (2019.01); *H04L 67/12* (2013.01)

(56) References Cited

U.S. PATENT DOCUMENTS

| | | | | |
|---|---|---|---|---|
| 9,398,012 | B2* | 7/2016 | Neuman | H04L 9/3234 |
| 2006/0085845 | A1* | 4/2006 | Davis | G06F 21/31 |
| | | | | 726/6 |
| 2006/0101454 | A1 | 5/2006 | Whitehead | |
| 2008/0034216 | A1* | 2/2008 | Law | H04L 9/3273 |
| | | | | 713/183 |
| 2010/0199086 | A1* | 8/2010 | Kuang | H04L 63/0869 |
| | | | | 713/155 |
| 2012/0278871 | A1* | 11/2012 | Wang | H04L 63/0823 |
| | | | | 726/7 |
| 2013/0023241 | A1* | 1/2013 | Lim | H04W 12/06 |
| | | | | 455/411 |
| 2013/0145420 | A1* | 6/2013 | Ting | H04L 63/08 |
| | | | | 726/1 |
| 2013/0160086 | A1* | 6/2013 | Katar | H04L 63/08 |
| | | | | 726/4 |
| 2015/0365402 | A1* | 12/2015 | Woo | H04L 63/067 |
| | | | | 726/6 |
| 2016/0021091 | A1* | 1/2016 | Hoyer | H04L 9/321 |
| | | | | 726/9 |
| 2016/0358186 | A1* | 12/2016 | Radocchia | H04W 12/06 |
| 2019/0087576 | A1* | 3/2019 | Olson | G06F 7/00 |

FOREIGN PATENT DOCUMENTS

| | | |
|---|---|---|
| CN | 103023917 | 4/2013 |
| CN | 103383736 | 11/2013 |
| CN | 103731802 A | 4/2014 |
| CN | 103916475 A | 7/2014 |
| CN | 104660618 | 5/2015 |
| CN | 104780154 A | 7/2015 |
| JP | 2004206258 A | 7/2004 |
| JP | 2011107842 A | 6/2011 |
| JP | 2013015992 A | 1/2013 |
| JP | 2015500608 A | 1/2015 |
| KR | 101305901 B1 | 9/2013 |

OTHER PUBLICATIONS

Translation of Chinese Office Action from corresponding Chinese Patent Application No. 201510549437.5, dated Dec. 27, 2018, 12 pages.
Translation of Chinese Search Report from corresponing Chinese Patent Application No. 201510549437.5, dated Dec. 18, 2018, 2 pages.
European Office Action dated Feb. 5, 2019 for European Patent Application No. 16840739.3, a counterpart of U.S. Appl. No. 15/906,996, 1 page.
Extended European Search Report dated Jan. 17, 2019 for European Patent Application No. 16840739.3, 9 pages.
Translation of International Search Report from corresponding PCT application No. PCT/CN2016/095858 dated Nov. 7, 2016, 2 pages.
Translation of Written Opinion from corresponding PCT application No. PCT/CN2016/095858 dated Nov. 7, 2016, 6 pages.
Translation of Chinese Office Action from corresponding Chinese Patent Application No. 201510549437.5, dated May 10, 2019, 13 pages.
Translation of Chinese Supplemental Search Report from corresponding Chinese Patent Application No. 201510549437.5, dated Sep. 26, 2019, 1 page.
Japanese Office Action dated Sep. 8, 2020 for Japanese Patent Application No. 2018-510915, a counterpart of U.S. Appl. No. 15/906,996, 7 pages.

* cited by examiner

VERIFICATION INFORMATION UPDATE

CROSS REFERENCE TO RELATED PATENT APPLICATIONS

This application claims priority to and is a continuation of PCT Patent Application No. PCT/CN2016/095858, filed on 18 Aug. 2016, which claims priority to Chinese Patent Application No. 201510549437.5, filed on 31 Aug. 2015 and entitled "VERIFICATION INFORMATION UPDATE METHOD AND APPARATUS", which are incorporated herein by reference in their entirety.

TECHNICAL FIELD

The present disclosure relates to the field of network security technologies, and, more particularly, to verification information update methods and apparatuses.

BACKGROUND

In order to provide users with Internet of Things services such as smart home and mobile health care services, information from multiple smart devices needs to be collected, which may include information of home devices such as a thermometer, a hygrometer, a refrigerator, and a lamp in the home of a user, and information of personal health such as blood pressure, blood sugar, heart rate, height, and weight. In conventional techniques, a verification number (Key) and a verification password (Secret) are assigned for each smart device by a management platform, a signature value is calculated based on the verification number and the verification password, and the identity of the smart device is authenticated based on the signature value at the management platform. As the verification number and the verification password are both preset before the smart device leaves the factory, and identical verification numbers and identical verification passwords are assigned to a same type of smart devices, the smart device is easily masqueraded or attacked, thus providing low security.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

In view of the above, the present disclosure provides a novel technical solution which dynamically updates verification information of a smart device, to increase the difficulty in monitoring the verification information during update.

The present disclosure provides the following technical solutions:

According to a first aspect of the present disclosure, a verification information update method is provided, which is applied to a server and includes:

receiving a first request message for binding to a first device such as a smart device from a second device such as a terminal device, the first request message carrying a unique identifier such as a universally unique identifier (UUID) of the smart device;

determining a binding relationship between the UUID and a user identifier of the terminal device, and generating a session random number corresponding to the binding relationship; and generating a new verification number and a new verification password of the smart device based on the session random number.

According to a second aspect of the present disclosure, a verification information update method is provided, which is applied to the second device such as the terminal device and includes:

sending a first request message for binding to the first device such as the smart device to a server, the first request message carrying a unique identifier such as UUID of the smart device;

receiving a session random number generated by the server based on the first request message; and sending the session random number to the smart device, such that the smart device generates a new verification number and a new verification password of the smart device based on the session random number.

According to a third aspect of the present disclosure, a verification information update method is provided, which is applied to the first device such as the smart device and includes:

receiving a session random number from a server forwarded by the second device such as the terminal device; and generating a new verification number and a new verification password of the smart device based on the session random number.

According to a fourth aspect of the present disclosure, a verification information update apparatus is provided, which is applied to a server and includes:

a first receiving module configured to receive a first request message for binding to the first device such as the smart device from the second device such as the terminal device, the first request message carrying a unique identifier such as UUID of the smart device;

a first determination module configured to determine a binding relationship between the UUID received by the first receiving module and a user identifier of the terminal device, and generate a session random number corresponding to the binding relationship; and a first generation module configured to generate a new verification number and a new verification password of the smart device based on the session random number determined by the first determination module.

According to a fifth aspect of the present disclosure, a verification information update apparatus is provided, which is applied to the second device such as the terminal device and includes:

a third sending module configured to send a first request message for binding to the first device such as the smart device to a server, the first request message carrying a unique identifier such as UUID of the smart device;

a fourth receiving module configured to receive a session random number generated by the server based on the first request message sent by the third sending module; and a fourth sending module configured to send the session random number received by the fourth receiving module to the smart device, such that the smart device generates a new verification number and a new verification password of the smart device based on the session random number.

According to a sixth aspect of the present disclosure, a verification information update apparatus is provided, which is applied to the first device such as the smart device and includes:

a seventh receiving module configured to receive a session random number from a server forwarded by the second device such as the terminal device; and a third generation module configured to generate a new verification number and a new verification password of the smart device based on the session random number received by the seventh receiving module.

As shown from the above technical solutions, in the present disclosure, a terminal device is introduced, and a session random number is generated by using a binding relationship between a unique identifier UUID of the first device such as a smart device and a user identifier of the second device such as a terminal device, thus implementing dynamic update of verification information of the smart device (a verification number and a verification password of the smart device in the present disclosure), and increasing the difficulty in monitoring the verification information during update. Authentication and authorization of the smart device and the server are implemented based on the verification information in a session, thereby enhancing the security of a system, and effectively preventing the smart device from being masqueraded or attacked in the Internet of Things.

BRIEF DESCRIPTION OF THE DRAWINGS

To illustrate the technical solutions in the example embodiments of the present disclosure clearly, the accompanying drawings for describing the example embodiments will be introduced briefly. Apparently, the accompanying drawings in the following description only represent some example embodiments of the present disclosure. Those of ordinary skill in the art may further obtain other drawings according to these accompanying drawings without creative efforts.

DETAILED DESCRIPTION

Example embodiments will be described in detail herein, and the example embodiments are shown in the accompanying drawings. In the following description involving the accompanying drawings, the same numerals in different accompanying drawings denote the same or similar elements, unless specified otherwise. Implementations described in the following example embodiments do not represent all implementations consistent with the present disclosure. In contrast, they are merely examples of apparatuses and methods consistent with some aspects of the present disclosure as described in detail in the appended claims.

Terms used in the present disclosure are merely used for describing specific embodiments, instead of limiting the present disclosure. Singular forms "a(n)", "said", and "the" used in the present disclosure and the appended claims also include plural forms, unless clearly specified in the context that other meanings are denoted. It should be further understood that, the term "and/or" used in this text refers to and includes any or all possible combinations of one or more associated items listed.

It should be understood that, although terms such as "first", "second", and "third" may be used to describe various kinds of information in the present disclosure, these kinds of information should not be limited to these terms. These terms are merely used to distinguish information of the same type from each other. For example, without departing from the scope of the present disclosure, the first information may also be referred to as second information, and similarly, the second information may also be referred to as first information. Depending on the context, the word "if" used here may be explained as "when . . . ", "as . . . ", or "in response to the determination".

In the present disclosure, a terminal device is introduced, and a session random number is generated by using a binding relationship between a UUID of a smart device and a user identifier of the terminal device, thus implementing dynamic update of verification information of the smart device (a verification number and a verification password of the smart device in the present disclosure), and increasing the difficulty in monitoring the verification information during update. Therefore, authentication and authorization of the smart device and the server are implemented based on the verification information in a session, thus enhancing the security of a system, and effectively preventing the smart device from being masqueraded or attacked in the Internet of Things.

The following embodiments are provided for further describing the present disclosure.

Figure 1A:
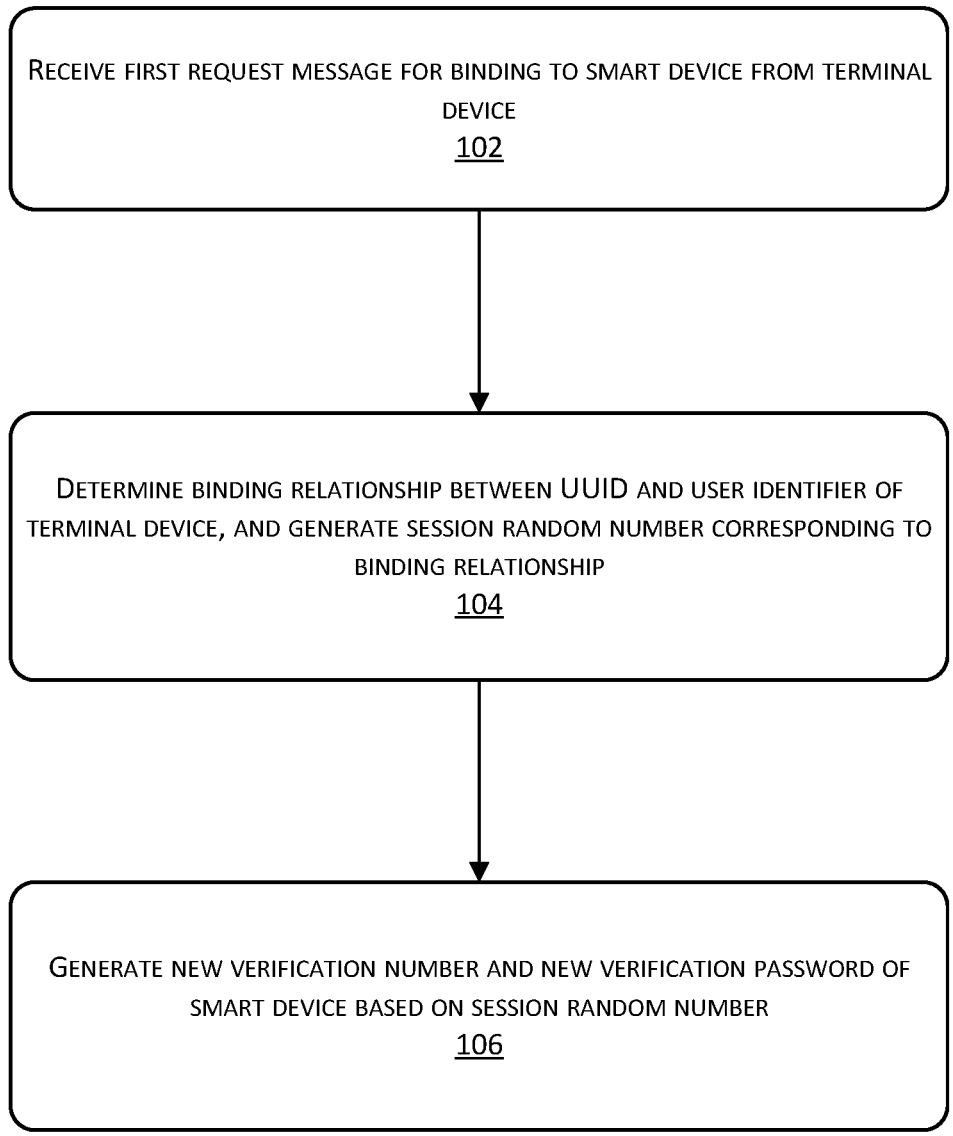
FIG. 1A is a schematic flowchart of a verification information update method according to a first example embodiment of the present invention.
Figure 1B:
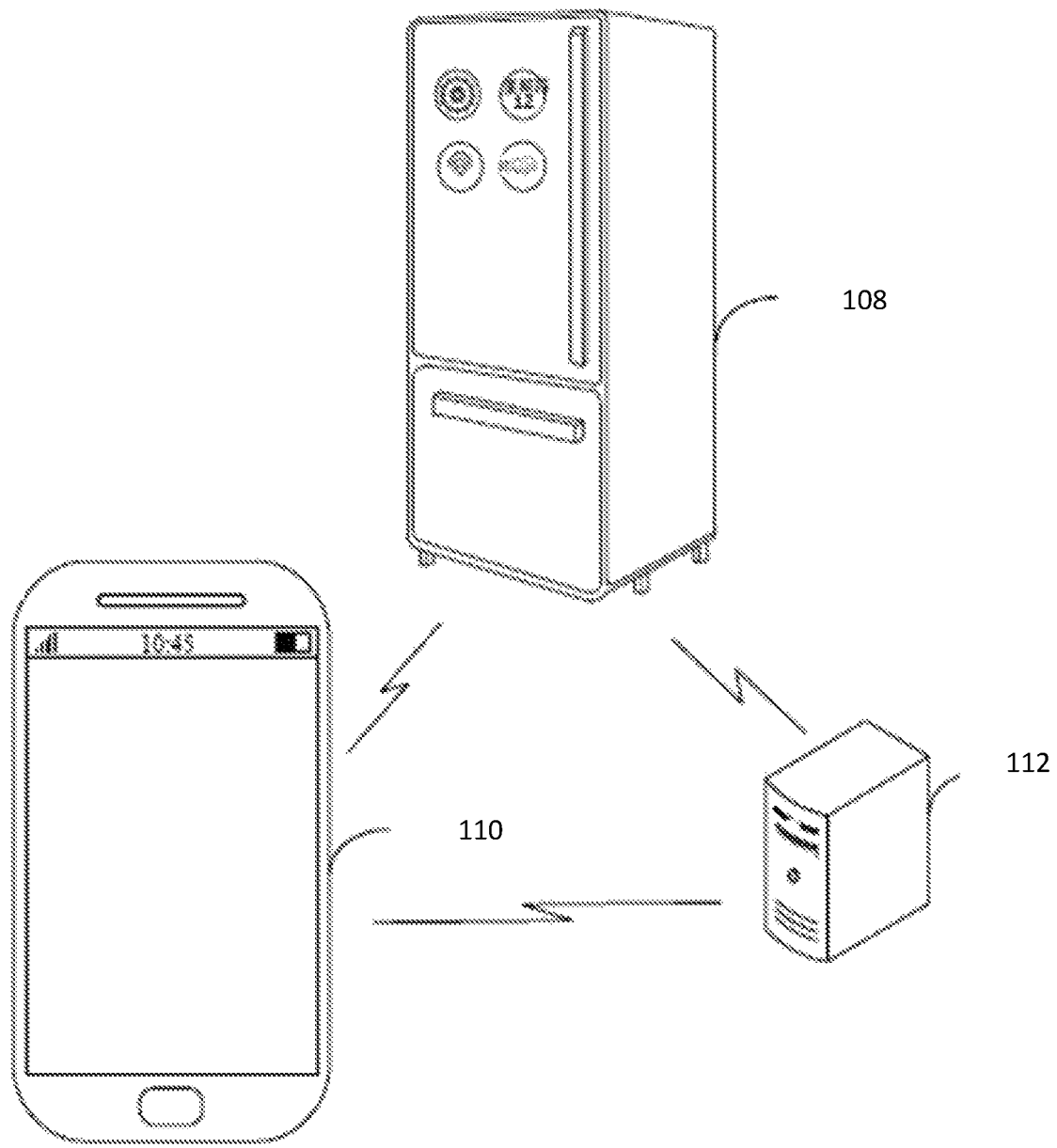
FIG. 1B is a scenario diagram according to the first example embodiment of the present invention.

FIG. 1A is a schematic flowchart of a verification information update method according to a first example embodiment of the present invention, and FIG. 1B is a scenario diagram according to a first example embodiment of the present invention. This embodiment is applied to a server, and as shown in FIG. 1A, includes the following steps:

Step 102: A first request message for binding to a smart device from a terminal device is received, the first request message carrying a UUID of the smart device.

Step 104: A binding relationship between the UUID and a user identifier of the terminal device is determined, and a session random number corresponding to the binding relationship is generated.

Step 106: A new verification number and a new verification password of the smart device are generated based on the session random number.

In step 102, in an example embodiment, the terminal device may be a device that may be installed with an application (app) or software, such as a smart phone and a tablet computer. The smart device may be a device having a communication function, such as a smart refrigerator, a smart TV, and a smart thermometer. In an example embodiment, the first request message may be generated by a user triggering a button on a user interface of an application installed in the terminal device, which carries the Universally Unique Identifier (UUID) of the smart device.

In step 104, during registration of the smart device on the server, the UUID of the smart device may be generated and a binding relationship between the smart device and a user identifier may be recorded. As such, it may be determined that only a user identifier having a binding relationship has a permission to manage the smart device. In an example embodiment, a session random number (session_random) may be generated by a pseudo random algorithm.

In step 106, in an example embodiment, the server may calculate a new verification number and a new verification password based on the session random number, for example, session_key=key+session_random;
session_Secret=Hash(secret+session_random);

where session_random denotes a session random number, session_key denotes a new verification number, session_Secret denotes a new verification password, key denotes an initial verification number of the smart device, and secret denotes an initial verification password.

As shown in FIG. 1B, for example, in an exemplary illustration, the first device such as the smart device is a smart refrigerator 108, the second device such as the terminal device is a smart phone 110, and the server 112 acquires device data from the smart refrigerator 108 and provides the smart refrigerator 108 with services such as query and control through an application on the smart phone 110.

When the server 112 needs to authenticate the smart refrigerator 108, the server 112 generates an initial verification number and an initial verification password for the smart refrigerator 108. When the smart refrigerator 108 needs to register on the server 112, a new verification number and a new verification password are generated by using the above step 102 to step 106. The smart refrigerator 108 and the server 112 authenticate the identity of the smart refrigerator 108 by using the new verification number and the new verification password in the subsequent authentication procedure, thus preventing the smart refrigerator 108 from being masqueraded or attacked by an illegal device.

As may be seen from the above description, in the example embodiment of the present invention, a terminal device is introduced, and a session random number is generated by using a binding relationship between a UUID of a smart device and a user identifier of the terminal device, thus implementing dynamic update of verification information of the smart device (a verification number and a verification password of the smart device in the present disclosure), and increasing the difficulty in monitoring the verification information during update. Therefore, authentication and authorization of the smart device and the server are implemented based on the verification information in a session, thus enhancing the security of a system, and effectively preventing the smart device from being masqueraded or attacked in the Internet of Things. Moreover, after acquiring the UUID of the smart device, a malicious user cannot bind the smart device as the UUID has been bound to a legal user identifier.

Figure 2:
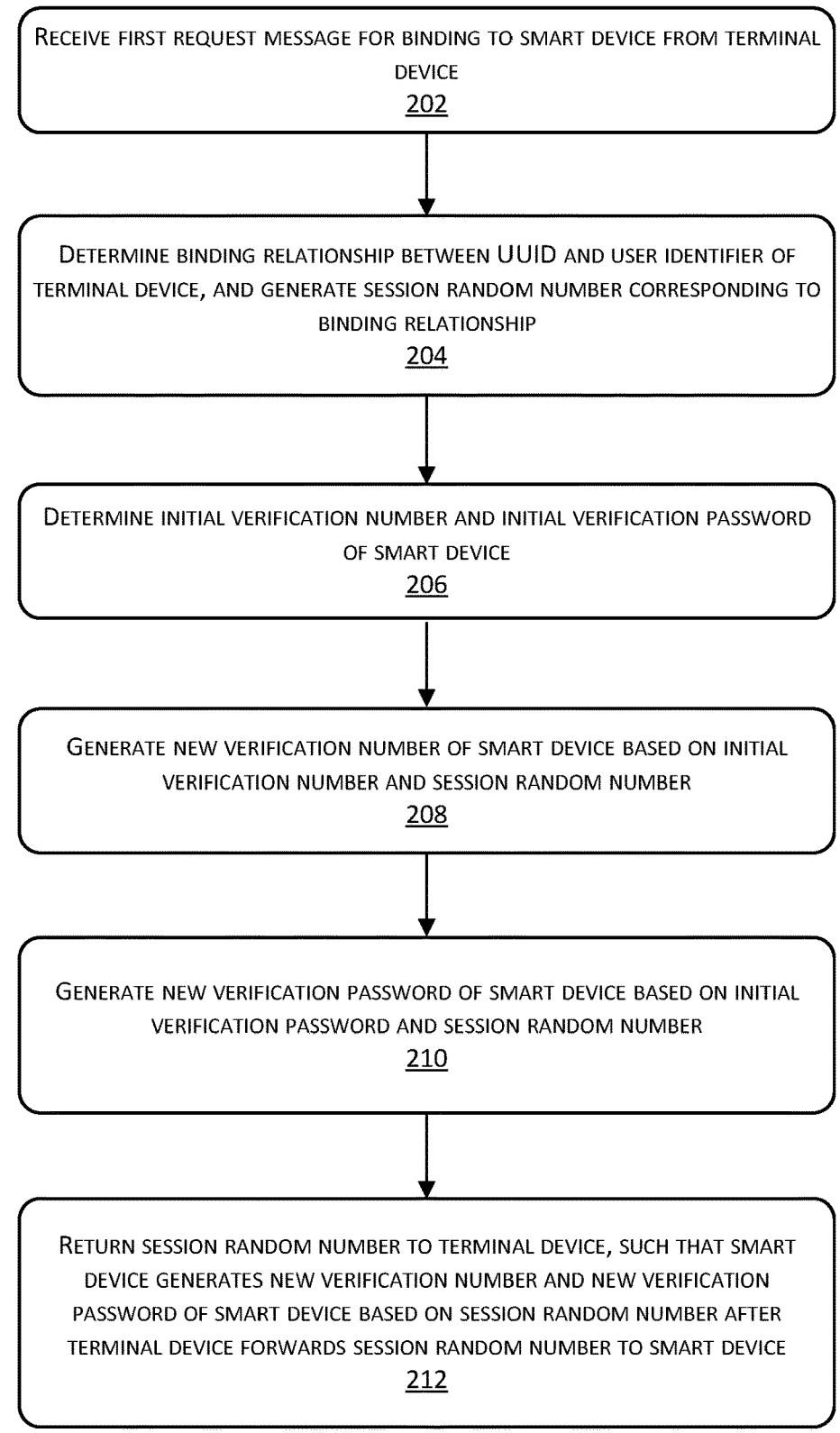
FIG. 2 is a schematic flowchart of a verification information update method according to a second example embodiment of the present invention.

FIG. 2 is a schematic flowchart of a verification information update method according to a second example embodiment of the present invention. This embodiment makes an exemplary illustration by taking generation of a session random number at a server side as an example. As shown in FIG. 2, the method includes the following steps:

Step 202: A first request message for binding to a smart device from a terminal device is received, the first request message carrying a UUID of the smart device.

Step 204: A binding relationship between the UUID and a user identifier of the terminal device is determined, and a session random number corresponding to the binding relationship is generated.

Step 206: An initial verification number and an initial verification password of the smart device are determined.

Step 208: A new verification number of the smart device is generated based on the initial verification number and the session random number.

Step 210: A new verification password of the smart device is generated based on the initial verification password and the session random number.

Step 212: The session random number is returned to the terminal device, such that the smart device generates a new verification number and a new verification password of the smart device based on the session random number after the terminal device forwards the session random number to the smart device.

Reference may be made to the above step 102 to step 104 for step 202 to step 204, which are not described in detail here.

In step 206, in an example embodiment, the server may pre-assign an initial verification number and an initial verification password (a Key/Secret pair) for each model of smart device before the smart device leaves the factory and is put into use. The assignment may be implemented for the smart device in a manner such as hardware writing, thus reducing operation and maintenance complexity of the server.

Reference may be made to related descriptions of the example embodiment shown in FIG. 1A for the descriptions of generating a new verification number and a new verification password in step 208 and step 210, which are not described in detail here.

In step 212, in an example embodiment, the smart device may generate a new verification number and a new verification password at a smart device side based on the session random number by using the generation method identical to that in the above step 208 and step 210. As such, it may be guaranteed that identical new verification numbers and identical new verification passwords are generated by the smart device and the server separately, thus facilitating the server to verify the smart device by using the new verification number and the new verification password.

In this embodiment, the terminal device forwards the session random number to the smart device, and it can guarantee that identical new verification numbers and identical new verification passwords are generated by the server and the smart device, thus facilitating the server to verify the smart device by using the new verification number and the new verification password. Transmission of the new verification number and the new verification password over the network is avoided, and therefore, the risk of leakage of the new verification number and the new verification password over the network is reduced.

Figure 3:
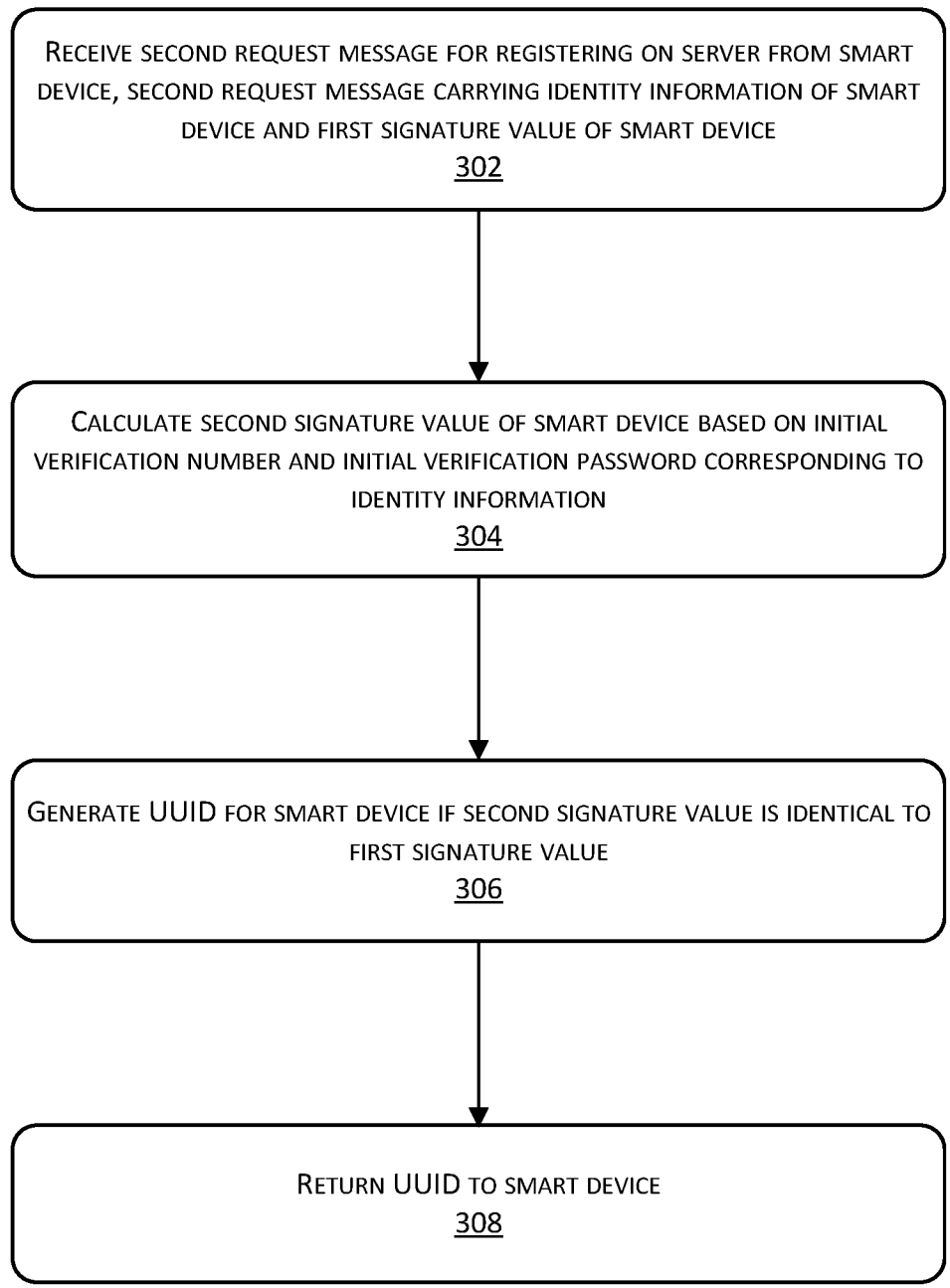
FIG. 3 is a schematic flowchart of a verification information update method according to a third example embodiment of the present invention.

FIG. 3 is a schematic flowchart of a verification information update method according to a third example embodiment of the present invention. This embodiment makes an exemplary illustration by taking acquisition of a UUID from a server by a smart device as an example. As shown in FIG. 3, the method includes the following steps:

Step 302: A second request message for registering on a server is received from a smart device, the second request message carrying identity information of the smart device and a first signature value of the smart device.

Step 304: A second signature value of the smart device is calculated based on an initial verification number and an initial verification password corresponding to the identity information.

Step 306: A UUID is generated for the smart device if the second signature value is identical to the first signature value.

Step 308: The UUID is returned to the smart device.

In step 302, in an example embodiment, the identity information of the smart device may include, but not limited to, a MAC of the smart device, a model of the smart device, a chip identity (ID) of the smart device, and an initial verification code of the smart device. In an example embodiment, the first signature value may be calculated by the smart device using a hash algorithm after the smart device ranks the initial verification number and the initial verification password of the smart device and forms a character string. Reference may be made to the example embodiment shown in FIG. 2 for the related descriptions of the initial verification number and the initial verification password, which are not described in detail here.

In step 304, in an example embodiment, the second signature value may also be calculated by the server using a hash algorithm after the server ranks the initial verification number and the initial verification password of the smart device and forms a character string.

In step 306, the UUID of the smart device may be generated by using a hash algorithm. Those skilled in the art may understand that the method for generating the UUID in the present disclosure is not limited, as long as the UUID of the smart device may be guaranteed to be unique.

In step 308, the UUID is returned to the smart device, such that the smart device may be recognized by using the UUID during subsequent interaction of the smart device and the terminal device, thus preventing the smart device from being masqueraded by an illegal device.

In this embodiment, when the second signature value is identical to the first signature value, a UUID having a unique identifier is generated for the smart device. As such, the server may bind the UUID to the user identifier of the terminal device and establish a binding relationship between the two. Therefore, after a malicious user acquires the UUID of the smart device, the smart device cannot be bound on the server, thus preventing the illegal user from controlling the smart device, preventing registration attack of a malicious device on the smart device, and improving the security of the system.

Figure 4:
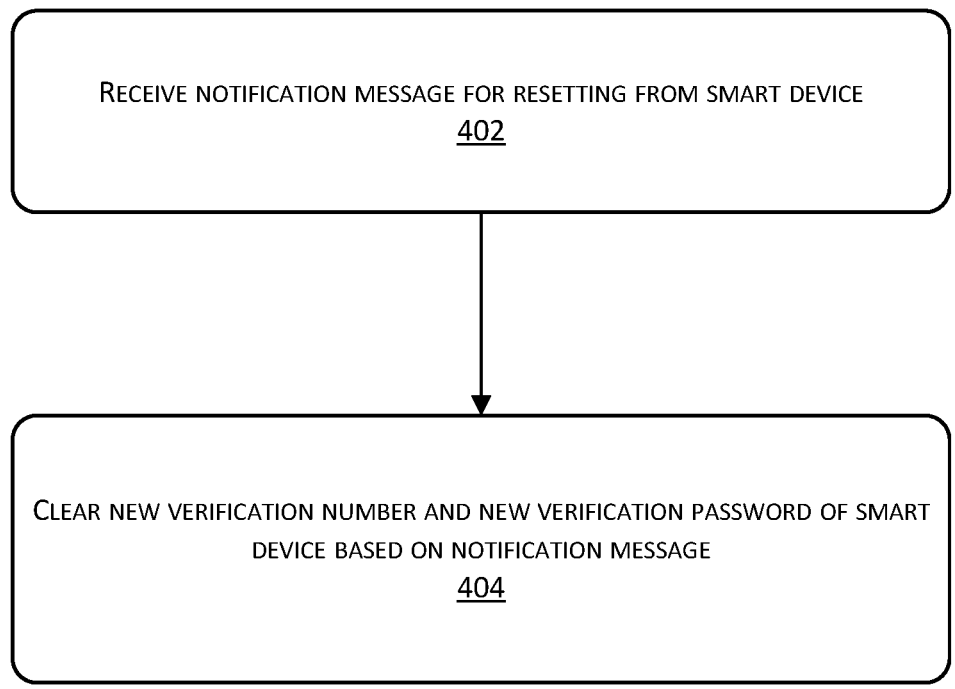
FIG. 4 is a schematic flowchart of a verification information update method according to a fourth example embodiment of the present invention.

FIG. 4 is a schematic flowchart of a verification information update method according to a fourth example embodiment of the present invention. This embodiment makes an exemplary illustration by taking clearing of a new verification number and a new verification password of a smart device at a server after the smart device is reset as an example.

Step 402: A notification message for resetting from a smart device is received.

Step 404: A new verification number and a new verification password of the smart device are cleared based on the notification message.

In step 402, in an example embodiment, a notification message may be generated after the smart device is reset by a physical button.

In step 404, in an example embodiment, related information of the smart device may all be cleared.

In this embodiment, the new verification number and the new verification password of the smart device are cleared after the smart device is reset, such that storage space of the server may be effectively released, and the new verification number and the new verification password may be prevented from being illegally used by other smart devices.

Figure 5:
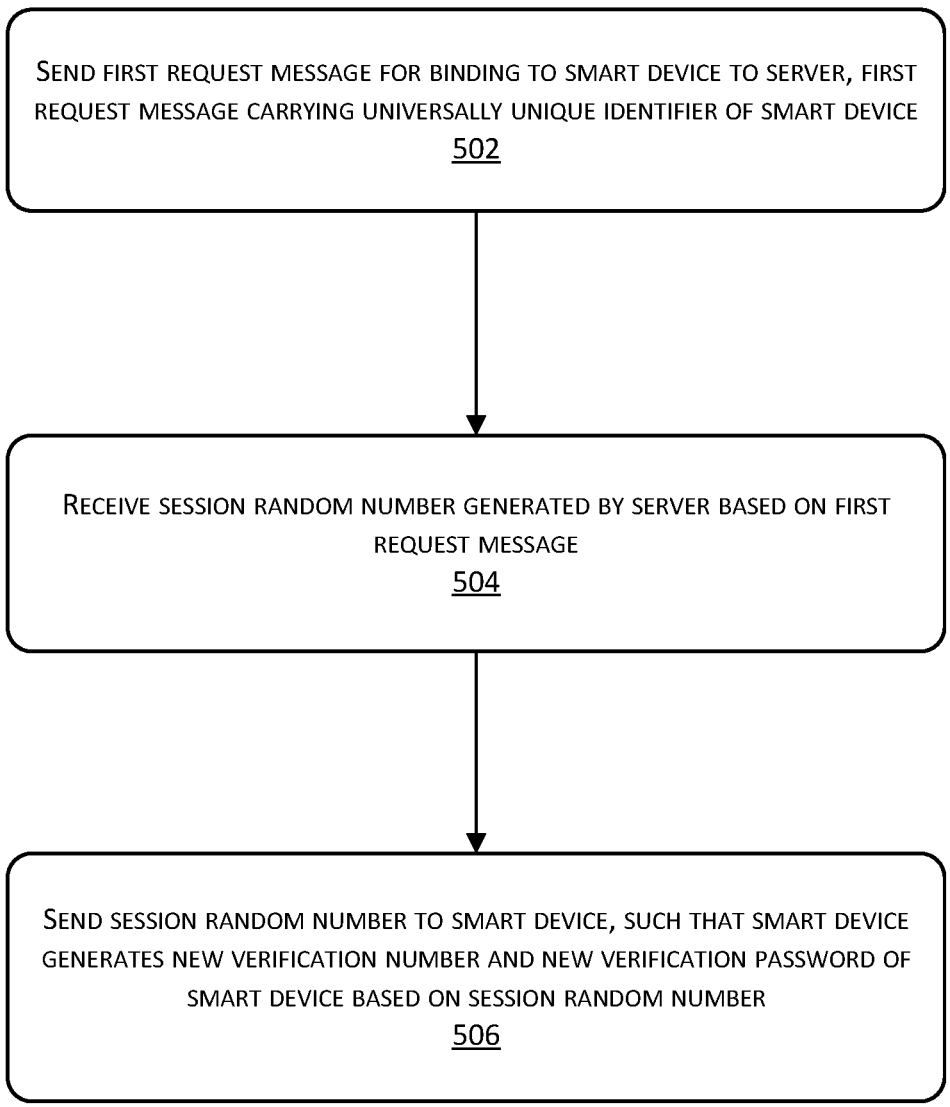
FIG. 5 is a schematic flowchart of a verification information update method according to a fifth example embodiment of the present invention.

FIG. 5 is a schematic flowchart of a verification information update method according to a fifth example embodiment of the present invention. This embodiment may be applied to a terminal device. The terminal device may be a device that may be installed with an application (app) or software, such as a smart phone and a tablet computer. As shown in FIG. 5, the method includes the following steps:

Step 502: A first request message for binding to a smart device is sent to a server, the first request message carrying a UUID of the smart device.

Step 504: A session random number generated by the server based on the first request message is received.

Step 506: The session random number is sent to the smart device, such that the smart device generates a new verification number and a new verification password of the smart device based on the session random number.

Reference may be made to the example embodiment shown in FIG. 1A for the related descriptions of the smart device and the first request message in step 502, which are not described in detail here.

Reference may be made to the example embodiment shown in FIG. 1A for the method of generating a session random number in step 504, which is not described in detail here.

In step 506, the session random number is sent to the smart device by using a point-to-point communication link established between a smart application and the smart device; or, the session random number is displayed on a user interface of the terminal device, such that a user input module of the smart device inputs to acquire the session random number input by the user.

As may be seen from the above descriptions, in the example embodiment of the present invention, the session random number that is generated by the server and corresponds to the binding relationship between the UUID and the user identifier of the terminal device is acquired through the terminal device, and the session random number is sent to the smart device, such that the smart device generates the new verification number and the new verification password of the smart device based on the session random number, thus implementing dynamic update of verification information (the verification number and the verification password of the smart device in the present disclosure) by using a third party, and increasing the difficulty in monitoring the verification information during update. Therefore, authentication and authorization of the smart device and the server are implemented based on the verification information in a session, thus enhancing the security of a system, and effectively preventing the smart device from being masqueraded or attacked in the Internet of Things.

Figure 6:
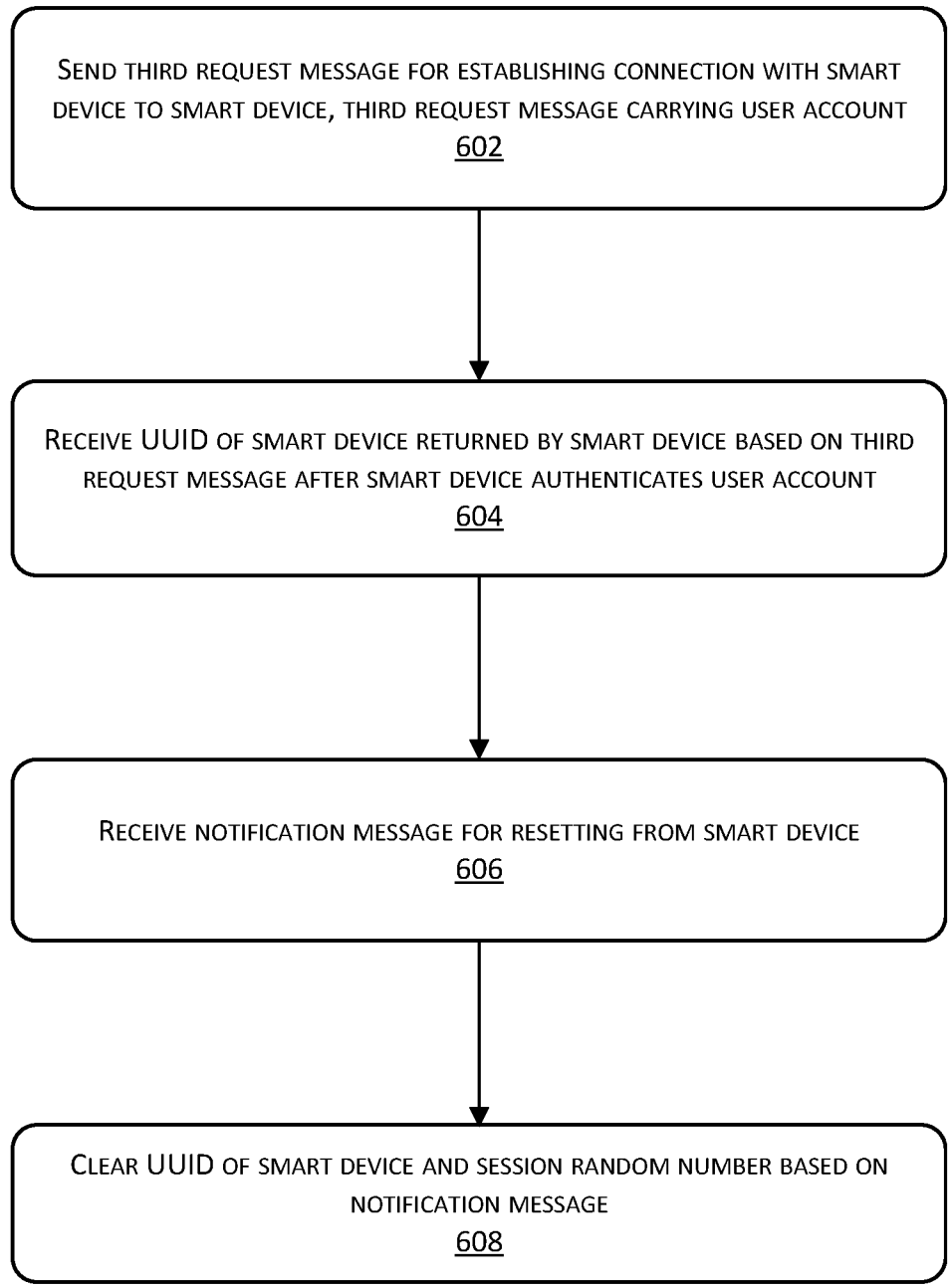
FIG. 6 is a schematic flowchart of a verification information update method according to a sixth example embodiment of the present invention.

FIG. 6 is a schematic flowchart of a verification information update method according to a sixth example embodiment of the present invention. This embodiment makes an exemplary illustration by taking generation of a UUID of a smart deceive at a server side and resetting of the UUID of the smart device and a session random number as an example. As shown in FIG. 6, the method includes the following steps:

Step 602: A third request message for establishing a connection with a smart device is sent to the smart device, the third request message carrying a user account.

Step 604: A UUID of the smart device returned by the smart device based on the third request message is received after the smart device authenticates the user account.

Step 606: A notification message for resetting from the smart device is received.

Step 608: The UUID of the smart device and the session random number are cleared based on the notification message.

In step 602, when needing to control the smart device, the user may log in to an application for controlling the smart device on the terminal device by using a user account and a user password, and send the third request message for establishing a connection with the smart device to the smart device by using the application.

In step 604, the smart device may authenticate the user account to determine whether the user account is a legal user. The UUID of the smart device is received to acquire the UUID of the smart device if the user account is a legal user. The smart device refuses to return the UUID to the terminal device if the user account is an illegal user.

In step 606 and step 608, related information of the smart device may all be cleared through a notification message generated after the smart device is reset by a physical button.

In this embodiment, the UUID of the smart device is acquired from the smart device, such that the UUID may be carried in the first request message, and then the server may generate a session random number that corresponds to the binding relationship between the UUID and the user identifier of the terminal device, and send the session random number to the smart device, thus preventing an illegal user from controlling the smart device, preventing registration attack of a malicious device on the smart device, and improving the security of the system. The new verification number and the new verification password of the smart device are cleared after the smart device is reset, such that storage space of the server may be effectively released, and the new verification number and the new verification password may be prevented from being illegally used by other smart devices.

Figure 7:
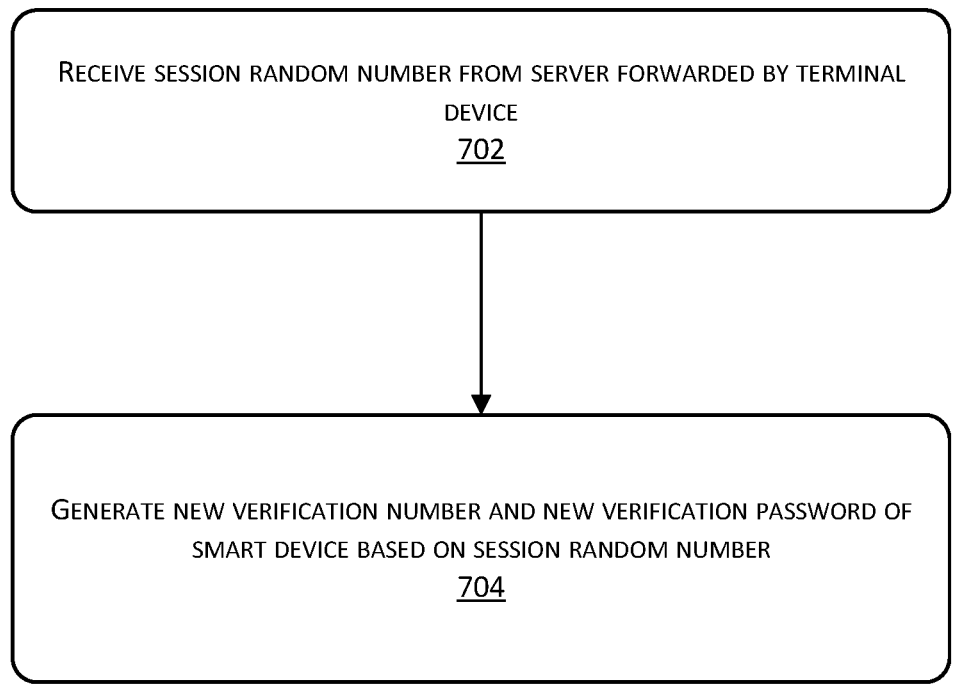
FIG. 7 is a schematic flowchart of a verification information update method according to a seventh example embodiment of the present invention.

FIG. 7 is a schematic flowchart of a verification information update method according to a seventh example embodiment of the present invention. This embodiment may be applied to a smart device. The smart device may be a device having a communication function, such as a smart refrigerator, a smart TV, and a smart thermometer. As shown in FIG. 7, the method includes the following steps:

Step 702: A session random number from a server forwarded by a terminal device is received.

Step 704: A new verification number and a new verification password of the smart device are generated based on the session random number.

In an example embodiment, reference may be made to the example embodiment shown in FIG. 1A for the method of generating a session random number and the generation of the new verification number and the new verification password of the smart device based on the session random number, which are not described in detail here.

As may be seen from the above descriptions, in the example embodiment of the present invention, the session random number from the server forwarded by the terminal device is received, and the new verification number and the new verification password of the smart device are generated based on the session random number, thus implementing dynamic update of verification information of the smart device (the verification number and the verification password of the smart device in the present disclosure), and increasing the difficulty in monitoring the verification information during update.

Figure 8:
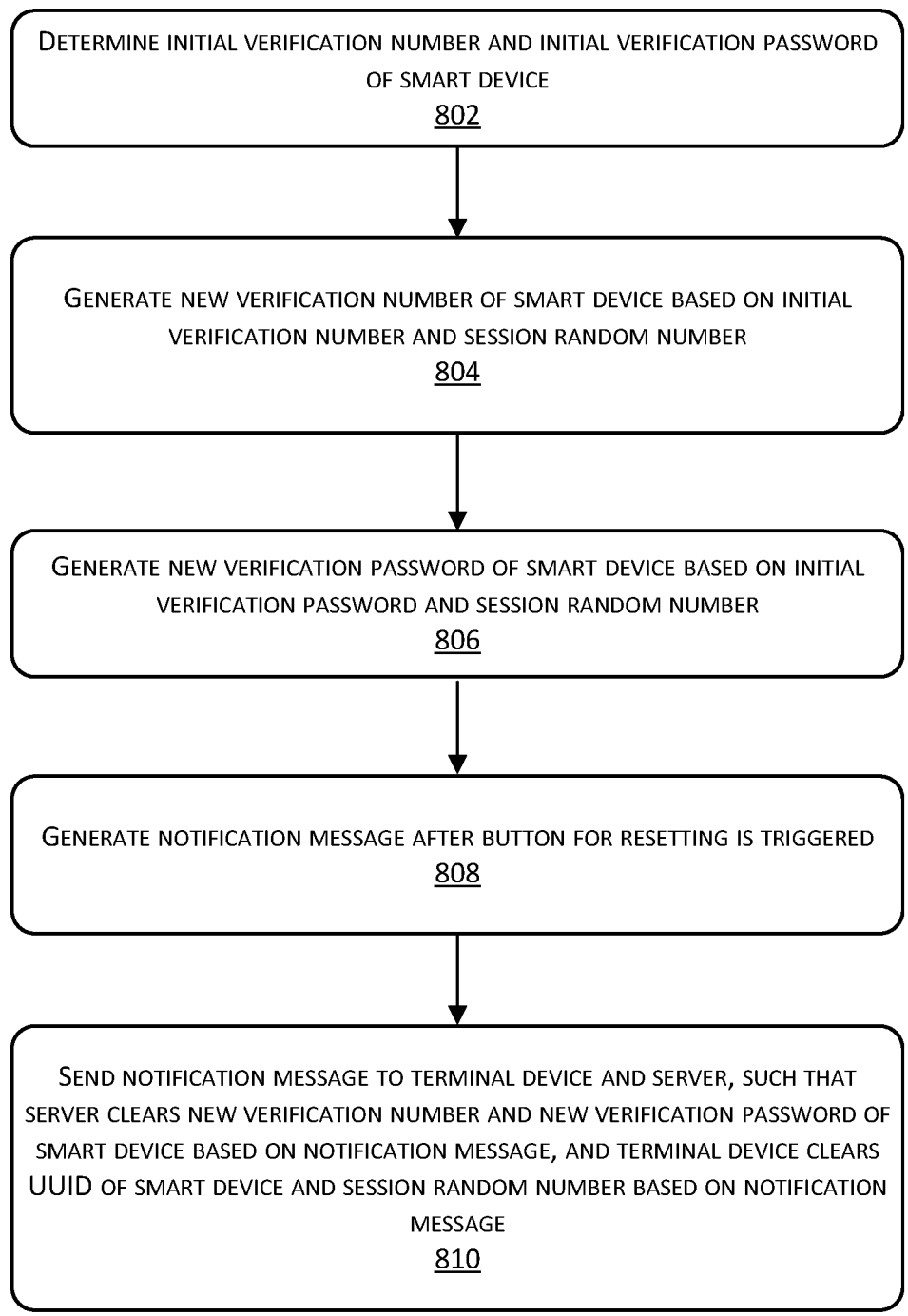
FIG. 8 is a schematic flowchart of a verification information update method according to an eighth example embodiment of the present invention.

FIG. 8 is a schematic flowchart of a verification information update method according to an eighth example embodiment of the present invention. This embodiment makes an exemplary illustration by taking generation of a session random number at a smart device side as an example. As shown in FIG. 8, the method includes the following steps:

Step 802: An initial verification number and an initial verification password of a smart device are determined.

Step 804: A new verification number of the smart device is generated based on the initial verification number and a session random number.

Step 806: A new verification password of the smart device is generated based on the initial verification password and the session random number.

Step 808: A notification message is generated after a button for resetting is triggered.

Step 810: The notification message is sent to a terminal device and a server, such that the server clears the new verification number and the new verification password of the smart device based on the notification message, and the terminal device clears a UUID of the smart device and the session random number based on the notification message.

Reference may be made to related descriptions of the example embodiment shown in FIG. 2 for the descriptions of step 802 to step 806, which are not described in detail here. Reference may be made to related descriptions of the example embodiment shown in FIG. 4 for the descriptions of step 808 to step 810, which are not described in detail here.

In this embodiment, the terminal device forwards the session random number to the smart device, and it may be guaranteed that identical new verification numbers and identical new verification passwords are generated by the server and the smart device, thus facilitating the server to verify the smart device by using the new verification number and the new verification password. Transmission of the new verification number and the new verification password over the network is avoided, and therefore, the risk of leakage of the new verification number and the new verification password over the network is reduced. The new verification number and the new verification password of the smart device are cleared after the smart device is reset, such that storage space of the server may be effectively released, and the new verification number and the new verification password may be prevented from being illegally used by other smart devices.

Figure 9:
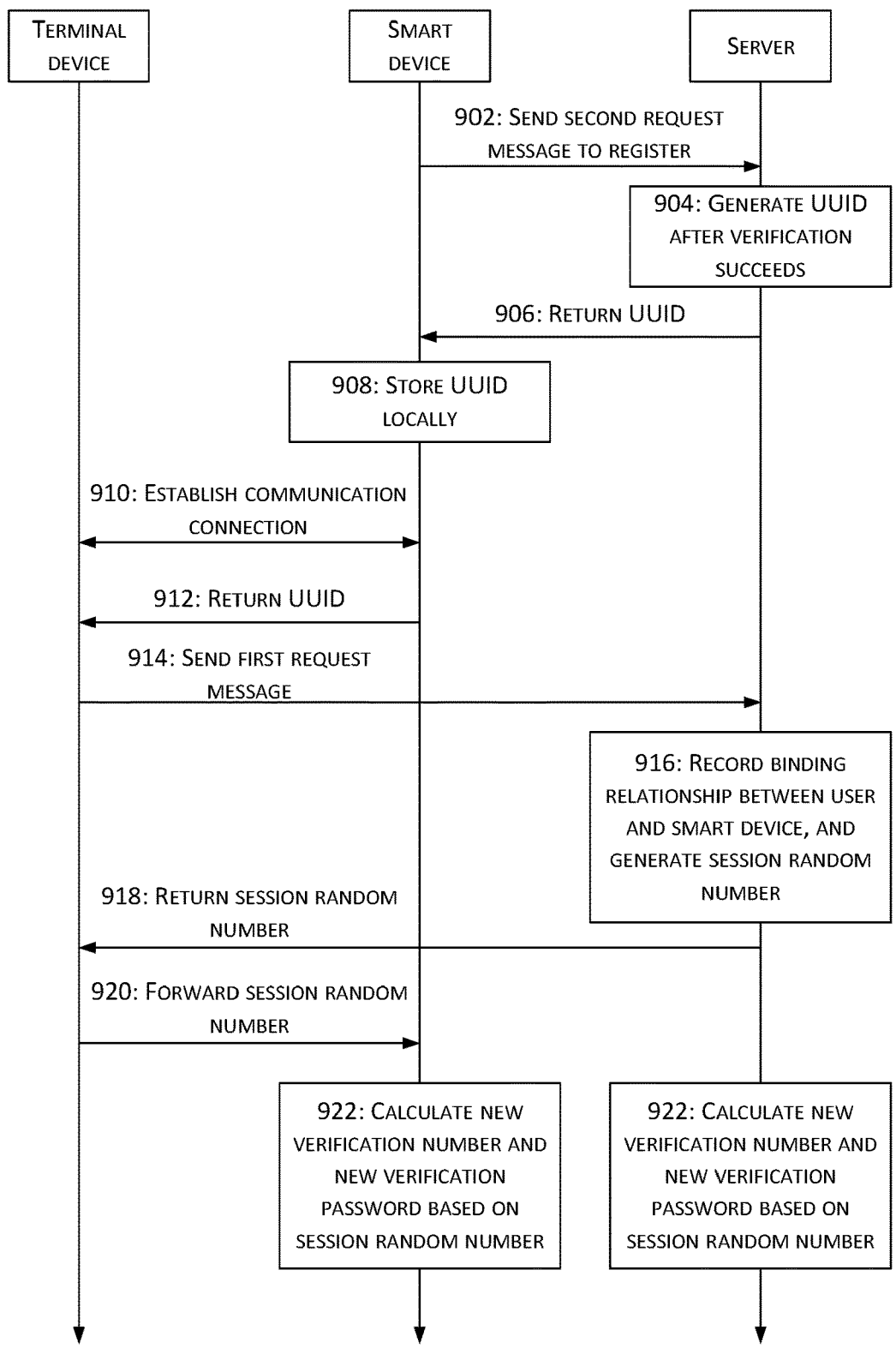
FIG. 9 is a signaling diagram of a verification information update method according to an example embodiment of the present invention.

FIG. 9 is a signaling diagram of a verification information update method according to an example embodiment of the present invention. A server needs to pre-assign an initial verification number and an initial verification password (also referred to as a Key/Secret pair) for each model of smart device before the smart device leaves the factory and is put into use. The assignment may be implemented for each smart device in a manner of hardware writing. As shown in FIG. 9, the method includes the following steps:

Step 902: The smart device sends a second request message to the server by using an initial Key/Secret pair to register the device. Here, the second request message may carry a MAC of the smart device, a model of the smart device, a chip identity (ID) of the smart device, and an initial verification code of the smart device. A first signature value may be calculated by using a hash algorithm (e.g., MD5) after the initial verification number and the initial verification password of the smart device are ranked lexicographically to form a character string.

Step 904: After receiving the second request message, the server calculates a second signature value by using the initial Key/Secret pair, and if the second signature value is identical to the received first signature value, verification succeeds and a unique UUID is generated for the smart device.

Step 906: The server returns the generated UUID to the smart device.

Step 908: The smart device receives the UUID and then stores the UUID locally in the smart device.

Step 910: The terminal device establishes a communication connection with the smart device. Here, an application of the terminal device may be logged in to by using a user account and a user password. A request for establishing a communication connection is sent to the smart device by using the application, to connect to the smart device and acquire the UUID of the smart device.

Step 912: The smart device returns the UUID to the terminal device.

Step 914: The terminal device sends a first request message for binding to the smart device to the server. Here, the first request message carries the UUID of the to-be-bound smart device.

Step 916: The server records a binding relationship between a user and the smart device, and generates a session random number (session_random).

Step 918: The server returns the session random number to the terminal device.

Step 920: The terminal device forwards the session random number to the smart device. Here, the forwarding method may include, but not limited to: first, the terminal device directly sends the session random number to the smart device by establishing a point-to-point communication link with the smart device; second, when the smart device has a user input module, the terminal device displays the received session random number on a user interface of the application to the user, and the user inputs the session random number to the smart device by using the user input module on the smart device.

Step 922: The smart device and the server separately calculate a new verification number and a new verification password based on the session random number by using the same calculation method.

Then, the identity of the smart device is authenticated by using the verification number and the new verification password, till the smart device is reset. After the reset, the smart device and the server will both clear the new verification numbers and the new verification passwords.

Therefore, registration attack of a malicious device may be prevented on the server. A malicious user cannot bind the smart device after acquiring the UUID of the smart device, thus improving the security of the system.

Figure 10:
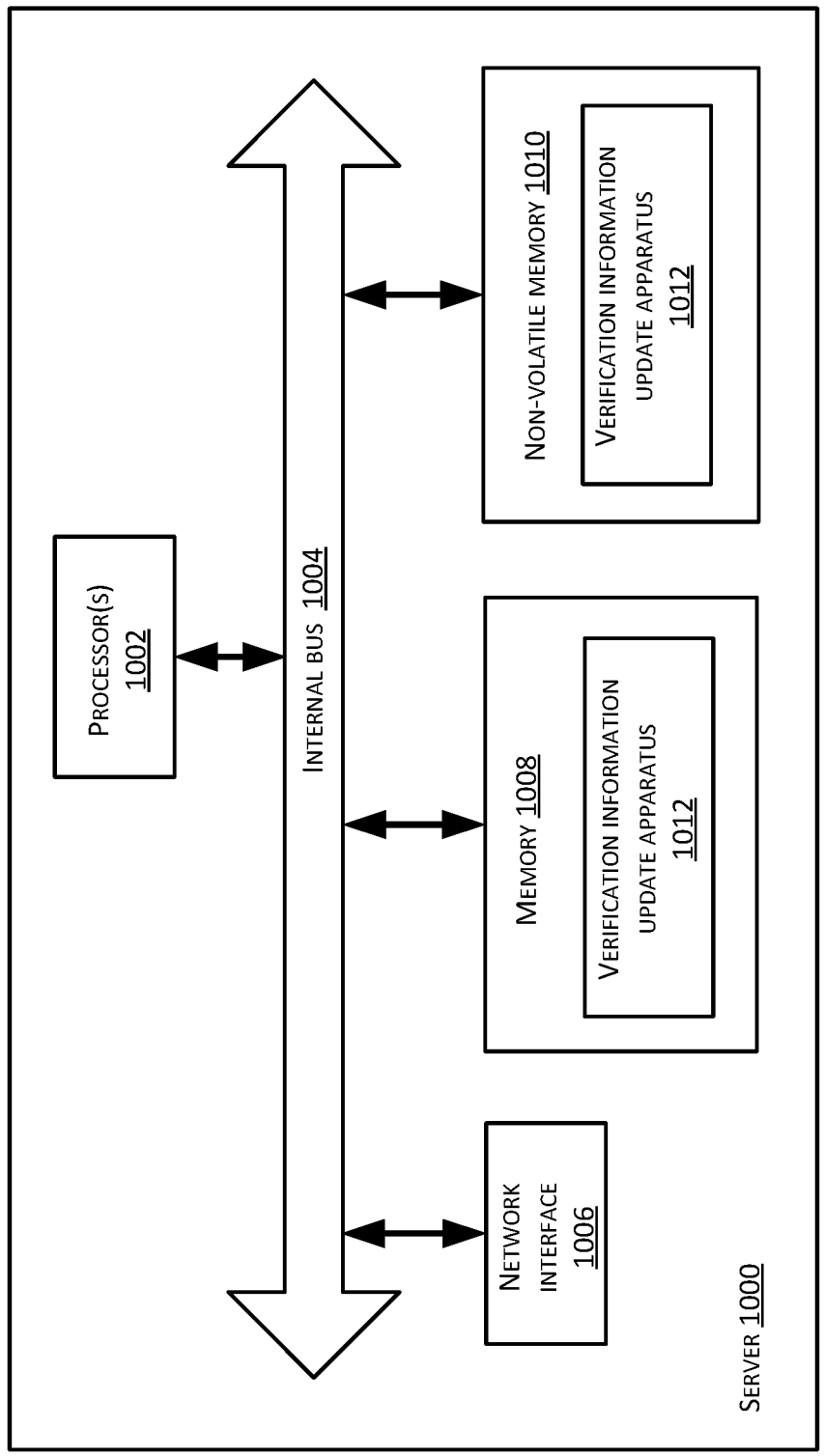
FIG. 10 is a schematic structural diagram of a server according to an example embodiment of the present disclosure.

Corresponding to the above verification information update method, the present disclosure further provides a schematic structural diagram of a server according to an example embodiment of the present disclosure as shown in FIG. 10. Referring to FIG. 10, on a hardware level, a server 1000 includes one or more processor(s) 1002, an internal bus 1004, a network interface 1006, a memory 1008, and a non-volatile memory 1010, and certainly may further include hardware required by other services. The processor(s) 1002 read a corresponding computer program or computer-readable instructions from the non-volatile memory 1010 to the memory 1008 and run the computer program, thus forming a verification information update apparatus 1012 on a logic level. Certainly, in addition to the software implementation manner, the present disclosure does not exclude other implementation manners, such as logic devices or a combination of software and hardware. In other words, the following processing procedure is performed by, but not limited to, various logic units, and may also be performed by hardware or logic devices. The memory 1008 and the non-volatile memory 1010 are examples of computer readable media.

Computer readable media, including both permanent and non-permanent, removable and non-removable media, may be stored by any method or technology for storage of information. The information can be computer readable instructions, data structures, modules of programs, or other data. Examples of computer storage media include, but are not limited to, phase change memory (PRAM), static random access memory (SRAM), dynamic random access memory (DRAM), other types of random access memory (RAM), read only memory Such as ROM, EEPROM, flash memory or other memory technology, CD-ROM, DVD, or other optical storage, Magnetic cassettes, magnetic tape magnetic tape storage or other magnetic storage devices, or any other non-transitory medium, may be used to store information that may be accessed by a computing device. As defined herein, computer-readable media do not include non-transitory transitory media such as modulated data signals and carriers.

Figure 11:
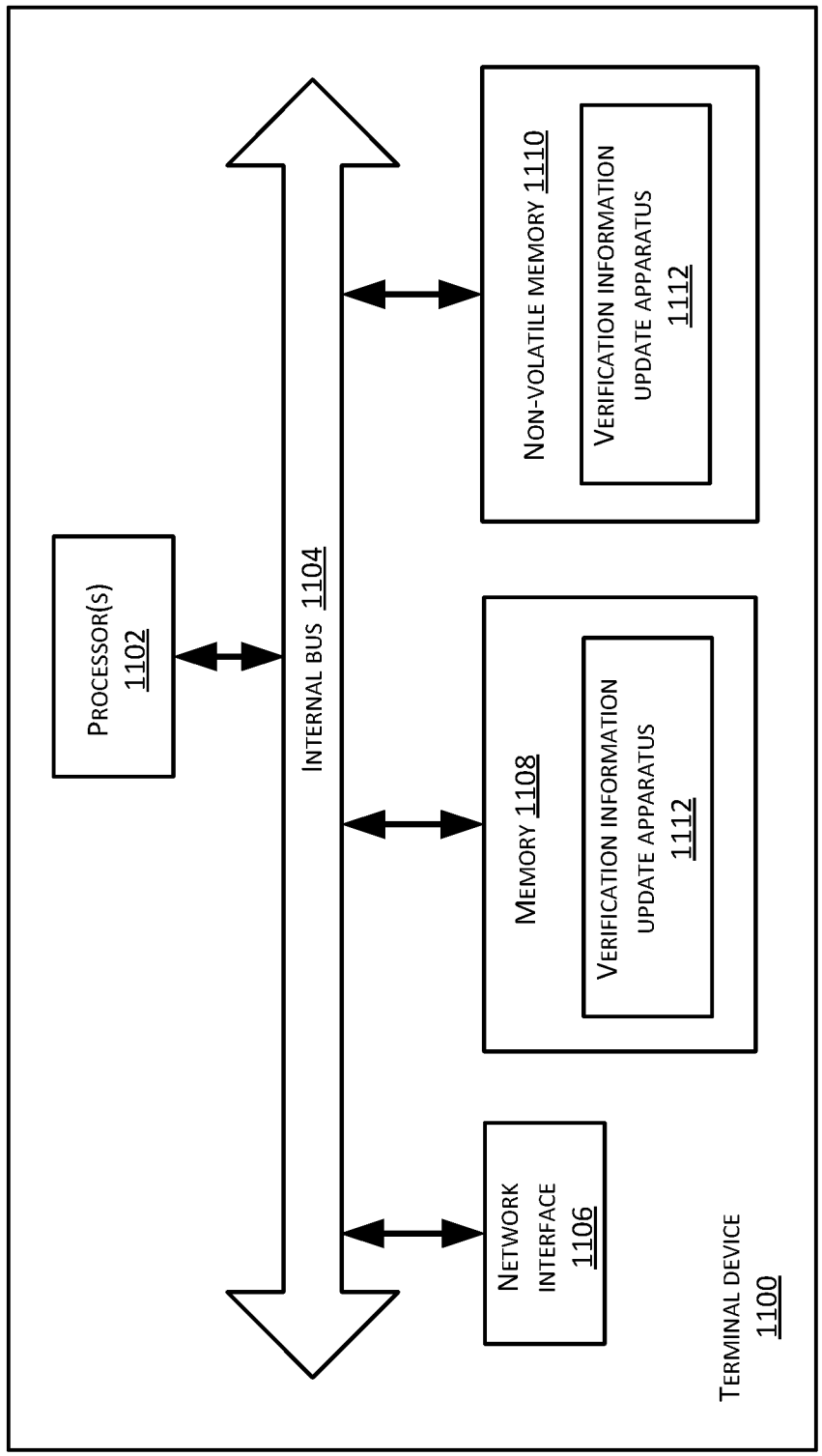
FIG. 11 is a schematic structural diagram of a terminal device according to an example embodiment of the present disclosure.

Corresponding to the above verification information update method, the present disclosure further provides a schematic structural diagram of a terminal device according to an example embodiment of the present disclosure as shown in FIG. 11. Referring to FIG. 11, on a hardware level, a terminal device 1100 includes one or more processor(s) 1102, an internal bus 1104, a network interface 1106, a memory 1108, and a non-volatile memory 1110, and certainly may further include hardware required by other services. The processor(s) 1102 read a corresponding computer program or computer-readable instructions from the non-volatile memory 1110 to the memory 1108 and run the computer program, thus forming a verification information update apparatus 1112 on a logic level. Certainly, in addition to the software implementation manner, the present disclosure does not exclude other implementation manners, such as logic devices or a combination of software and hardware. In other words, the following processing procedure is performed by, but not limited to, various logic units, and may also be performed by hardware or logic devices. The memory 1108 and the non-volatile memory 1110 are examples of computer readable media.

Figure 12:
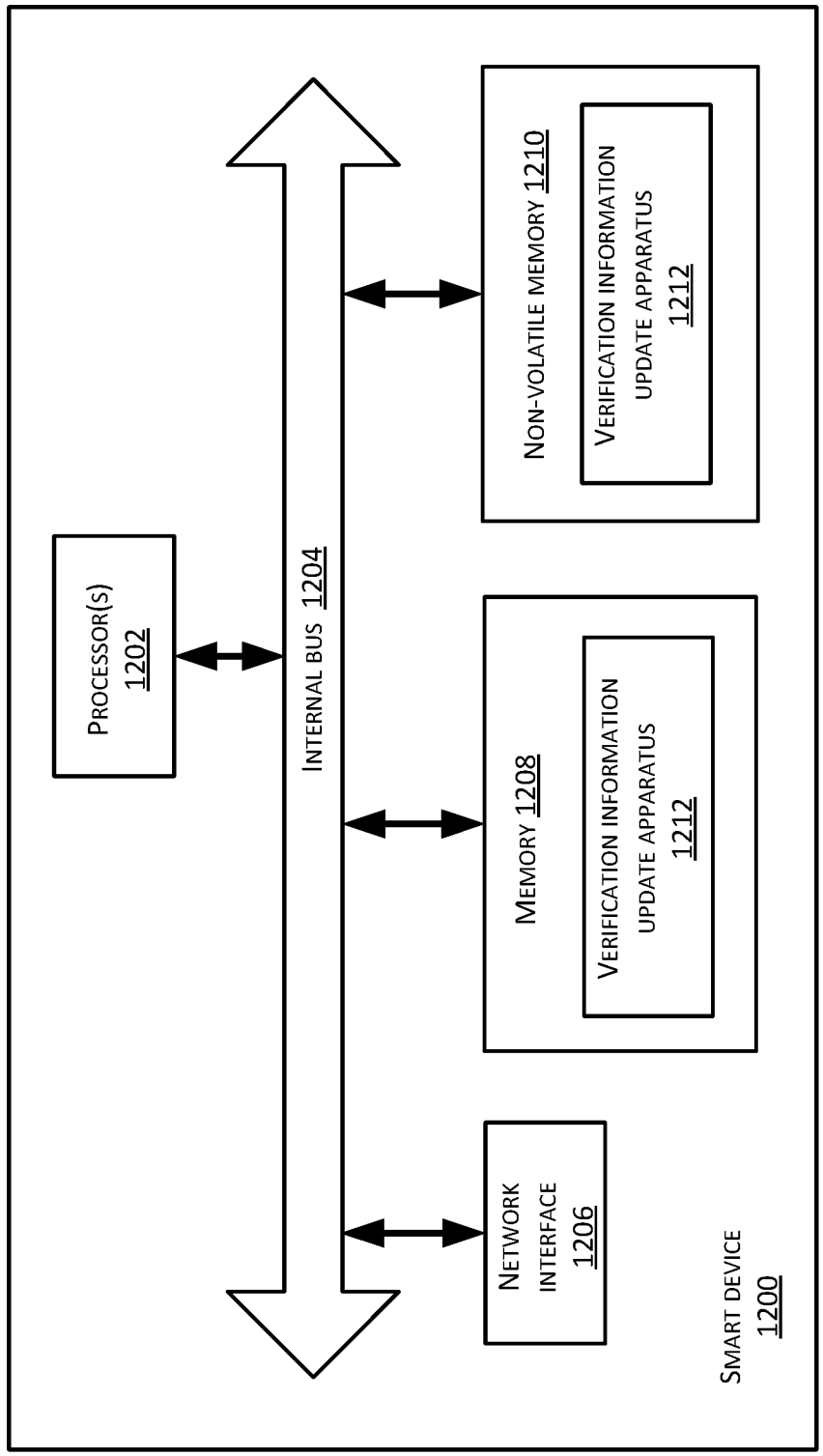
FIG. 12 is a schematic structural diagram of a smart device according to an example embodiment of the present disclosure.

Corresponding to the above verification information update method, the present disclosure further provides a schematic structural diagram of a smart device according to an example embodiment of the present disclosure as shown in FIG. 12. Referring to FIG. 12, on a hardware level, a smart device 1200 includes one or more processor(s) 1202, an internal bus 1204, a network interface 1206, a memory 1208, and a non-volatile memory 1210, and certainly may further include hardware required by other services. The processor(s) 1202 read a corresponding computer program or computer-readable instructions from the non-volatile memory 1210 to the memory 1208 and run the computer program, thus forming a verification information update apparatus 1212 on a logic level. Certainly, in addition to the software implementation manner, the present disclosure does not exclude other implementation manners, such as logic devices or a combination of software and hardware. In other words, the following processing procedure is performed by, but not limited to, various logic units, and may also be performed by hardware or logic devices. The memory 1208 and the non-volatile memory 1210 are examples of computer readable media.

Figure 13:
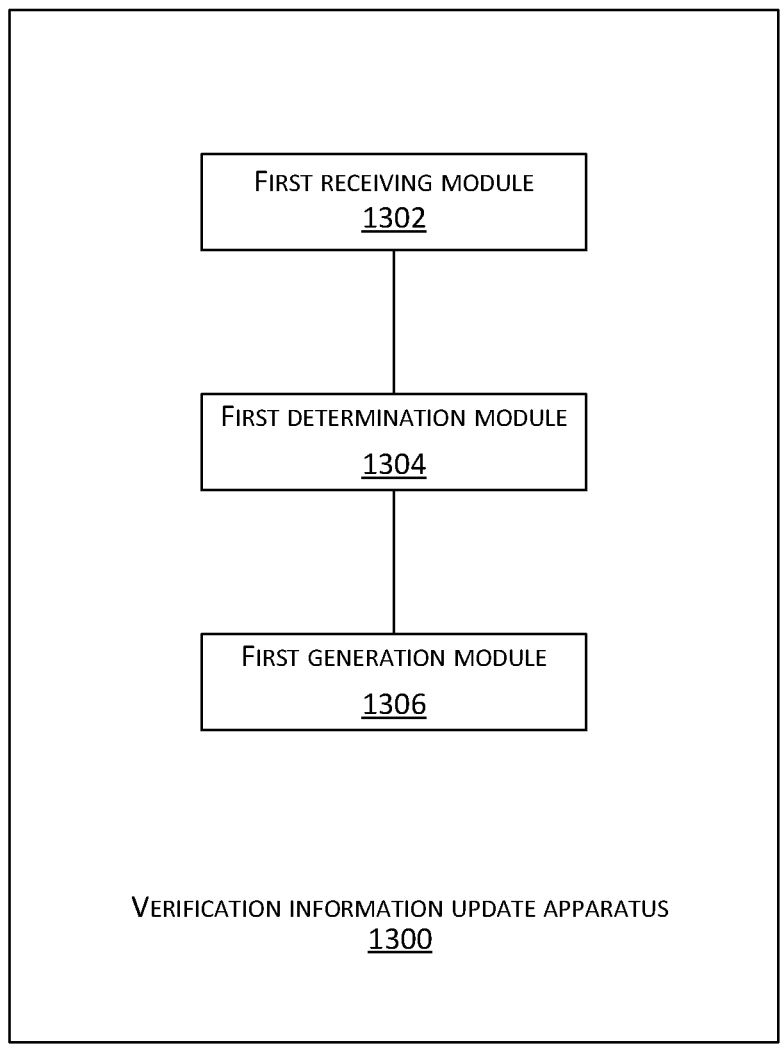
FIG. 13 is a schematic structural diagram of a verification information update apparatus according to the first example embodiment of the present invention.

FIG. 13 is a schematic structural diagram of a verification information update apparatus according to a first example embodiment of the present invention, which may be applied to a server. As shown in FIG. 13, a verification information update apparatus 1300 may include: a first receiving module 1302, a first determination module 1304, and a first generation module 1306.

The first receiving module 1302 is configured to receive a first request message for binding to a smart device from a terminal device, the first request message carrying a UUID of the smart device.

The first determination module 1304 is configured to determine a binding relationship between the UUID received by the first receiving module 1302 and a user identifier of the terminal device, and generate a session random number corresponding to the binding relationship.

The first generation module 1306 is configured to generate a new verification number and a new verification password of the smart device based on the session random number determined by the first determination module 1304.

Figure 14:
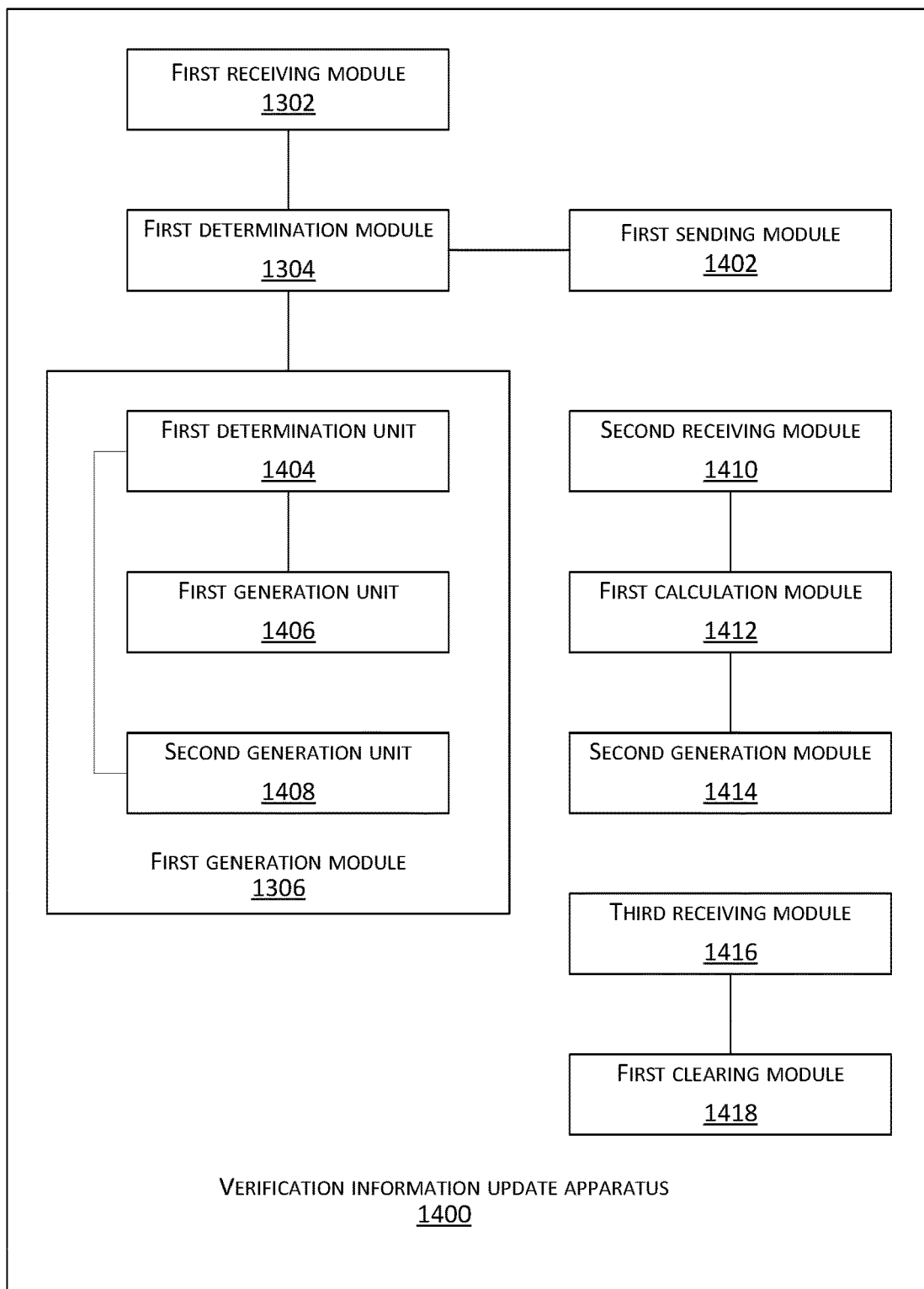
FIG. 14 is a schematic structural diagram of a verification information update apparatus according to the second example embodiment of the present invention.

FIG. 14 is a schematic structural diagram of a verification information update apparatus according to a second example embodiment of the present invention. As shown in FIG. 14, on the basis of the example embodiment shown in FIG. 13, a verification information update apparatus 1400 may further include:

a first sending module 1402 configured to return the session random number determined by the first determination module 1304 to the terminal device, such that the smart device generates a new verification number and a new verification password of the smart device based on the session random number after the terminal device forwards the session random number to the smart device.

In an example embodiment, the first generation module 1306 may include:

a first determination unit 1404 configured to determine an initial verification number and an initial verification password of the smart device;

a first generation unit 1406 configured to generate the new verification number of the smart device based on the initial verification number determined by the first determination unit 1402 and the session random number; and a second generation unit 1408 configured to generate the new verification password of the smart device based on the initial verification password determined by the first determination unit 1402 and the session random number.

In an example embodiment, the verification information update apparatus 1400 further includes:

a second receiving module 1410 configured to receive a second request message for registering on the server from the smart device, the second request message carrying identity information of the smart device and a first signature value of the smart device;

a first calculation module 1412 configured to calculate a second signature value of the smart device based on an initial verification number and an initial verification password corresponding to the identity information carried in the second request message received by the second receiving module 1410;

a second generation module 1414 configured to generate the UUID for the smart device if the second signature value calculated by the first calculation module 1412 is identical to the first signature value; and a second sending module (not shown in FIG. 14) configured to return the UUID generated by the second generation module to the smart device.

In an example embodiment, the first signature value may be calculated by the smart device using a hash algorithm after the smart device ranks the initial verification number and the initial verification password of the smart device and forms a character string.

In an example embodiment, the verification information update apparatus 1400 may further include:

a third receiving module 1416 configured to receive a notification message for resetting from the smart device; and a first clearing module 1418 configured to clear the new verification number and the new verification password of the smart device based on the notification message received by the third receiving module 1416.

Figure 15:
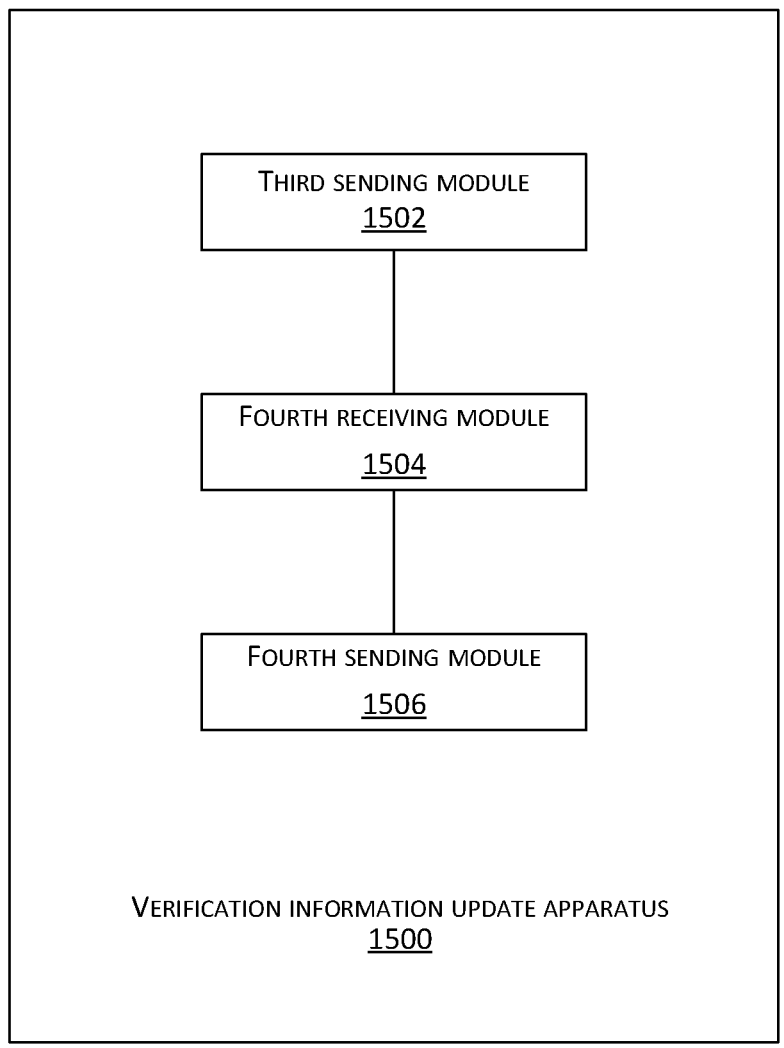
FIG. 15 is a schematic structural diagram of a verification information update apparatus according to the third example embodiment of the present invention.

FIG. 15 is a schematic structural diagram of a verification information update apparatus according to a third example embodiment of the present invention, which may be applied to a terminal device. As shown in FIG. 15, a verification information update apparatus 1500 may include: a third sending module 1502, a fourth receiving module 1504, and a fourth sending module 1506.

The third sending module 1502 is configured to send a first request message for binding to a smart device to a server, the first request message carrying a UUID of the smart device.

The fourth receiving module 1504 is configured to receive a session random number generated by the server based on the first request message sent by the third sending module 1502.

The fourth sending module 1506 is configured to send the session random number received by the fourth receiving module 1504 to the smart device, such that the smart device generates a new verification number and a new verification password of the smart device based on the session random number.

Figure 16:
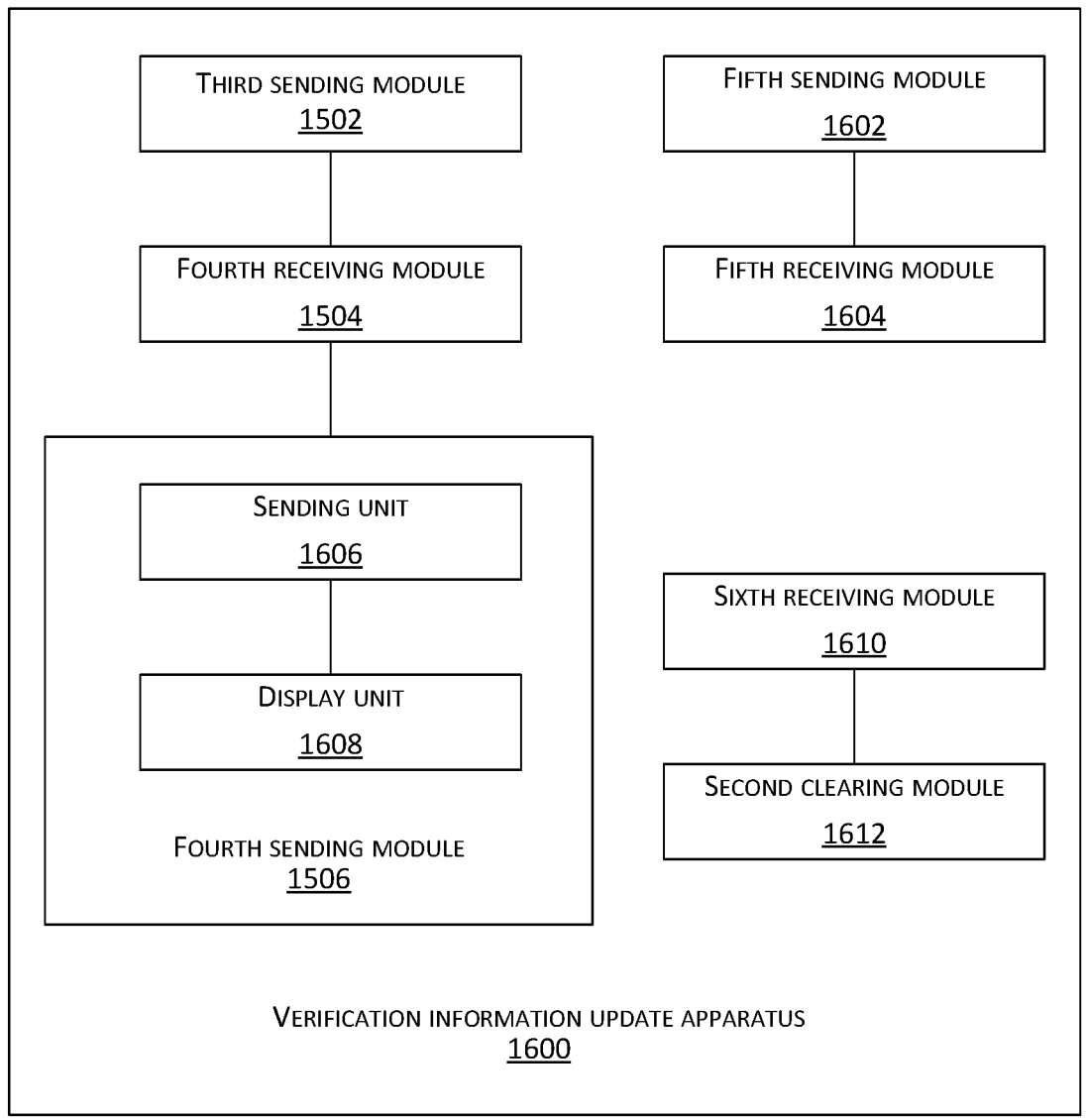
FIG. 16 is a schematic structural diagram of a verification information update apparatus according to the fourth example embodiment of the present invention.

FIG. 16 is a schematic structural diagram of a verification information update apparatus according to a fourth example embodiment of the present invention. As shown in FIG. 16, on the basis of the example embodiment shown in FIG. 15, a verification information update apparatus 1600 further includes:

a fifth sending module 1602 configured to send a third request message for establishing a connection with the smart device to the smart device, the third request message carrying a user account; and a fifth receiving module 1604 configured to receive the UUID of the smart device returned by the smart device based on the third request message after the smart device authenticates the user account carried in the third request message sent by the fifth sending module 1602.

In an example embodiment, the fourth sending module 1506 may include:

a sending unit 1606 configured to send the session random number to the smart device by using a point-to-point communication link established between a smart application and the smart device; or a display unit 1608 configured to display the session random number on a user interface of the terminal device, such that a user input module of the smart device inputs to acquire the session random number input by the user.

In an example embodiment, the verification information update apparatus 1600 may further include:

a sixth receiving module 1610 configured to receive a notification message for resetting from the smart device; and a second clearing module 1612 configured to clear the UUID of the smart device and the session random number based on the notification message received by the sixth receiving module 1610.

Figure 17:
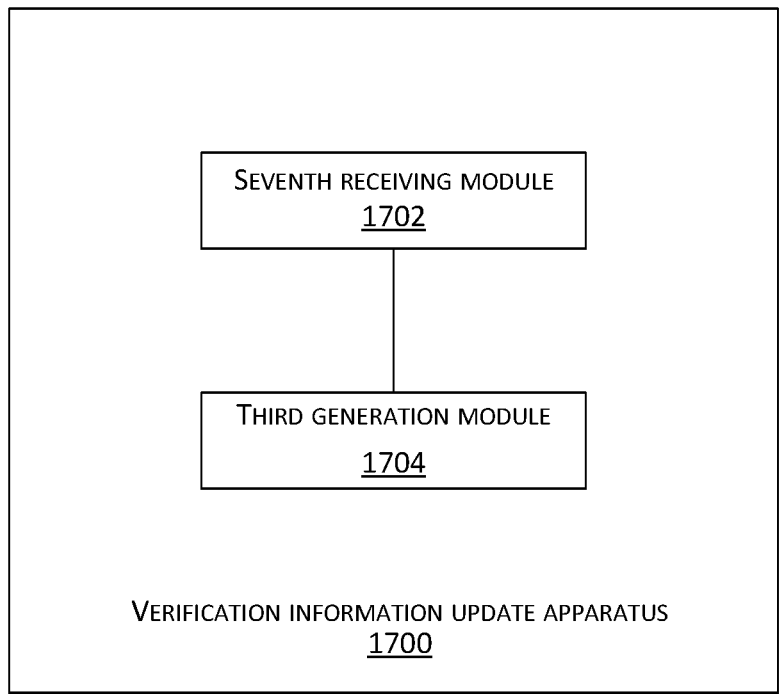
FIG. 17 is a schematic structural diagram of a verification information update apparatus according to the fifth example embodiment of the present invention.

FIG. 17 is a schematic structural diagram of a verification information update apparatus according to a fifth example embodiment of the present invention, which may be applied to a smart device. As shown in FIG. 17, the verification information update apparatus may include: a seventh receiving module 1702 and a third generation module 1704.

The seventh receiving module 1702 is configured to receive a session random number from a server forwarded by a terminal device.

The third generation module 1704 is configured to generate a new verification number and a new verification password of the smart device based on the session random number received by the seventh receiving module 1702.

Figure 18:
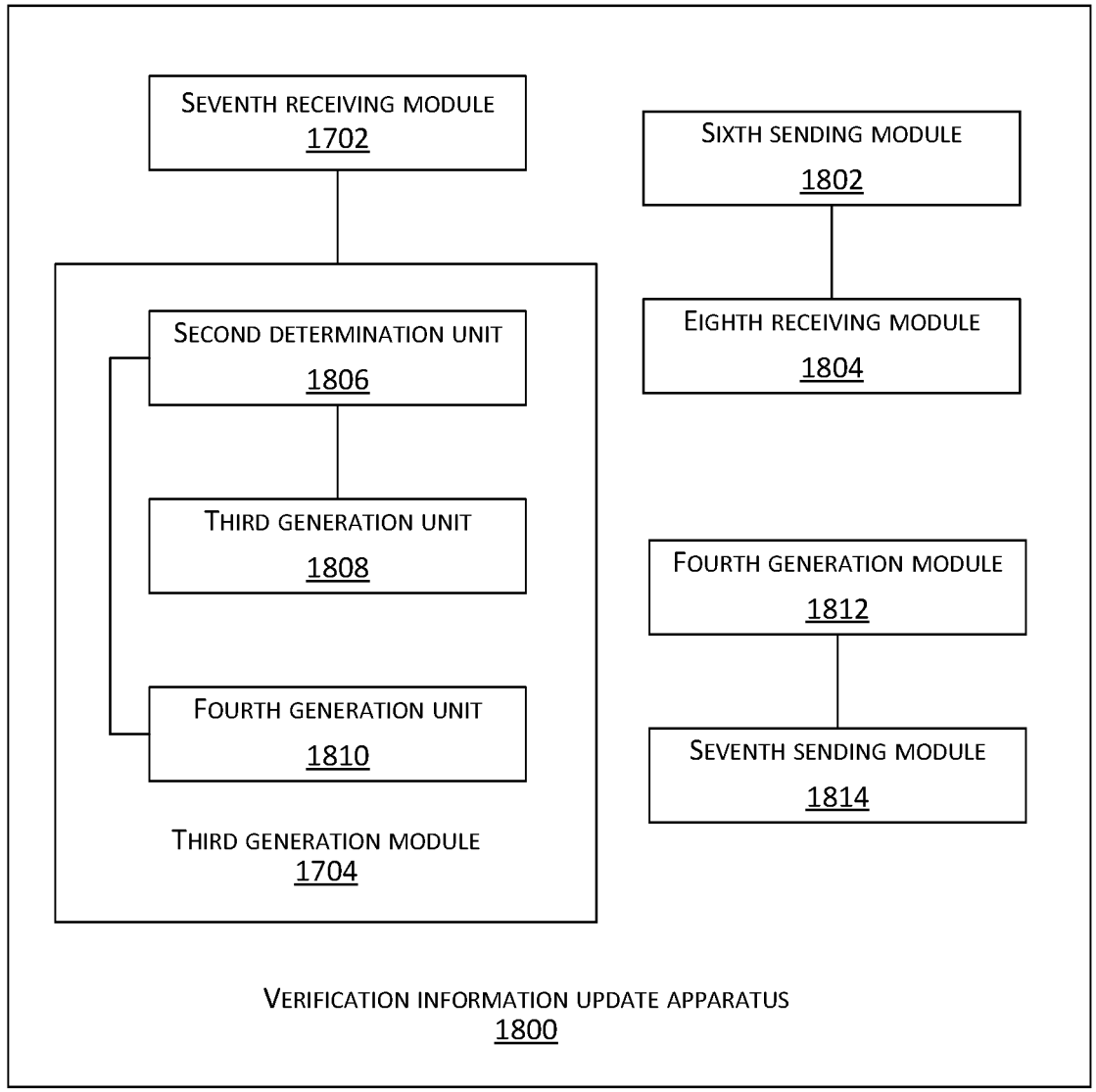
FIG. 18 is a schematic structural diagram of a verification information update apparatus according to the sixth example embodiment of the present invention.

FIG. 18 is a schematic structural diagram of a verification information update apparatus according to a sixth example embodiment of the present invention. As shown in FIG. 18, on the basis of the example embodiment shown in FIG. 17, a verification information update apparatus 1800 may further include:

a sixth sending module 1802 configured to send to the server a second request message for registering on the server, the second request message carrying identity information of the smart device and a first signature value of the smart device; and an eighth receiving module 1804 configured to receive a UUID of the smart device generated by the server based on the second request message.

In an example embodiment, the third generation module 1704 may include:

a second determination unit 1806 configured to determine an initial verification number and an initial verification password of the smart device;

a third generation unit 1808 configured to generate the new verification number of the smart device based on the initial verification number determined by the second determination unit 1806 and the session random number; and a fourth generation unit 1810 configured to generate the new verification password of the smart device based on the initial verification password determined by the second determination unit 1808 and the session random number.

In an example embodiment, the verification information update apparatus 1800 may further include:

a fourth generation module 1812 configured to generate a notification message after it is detected that a button for resetting is triggered;

a seventh sending module 1814 configured to send the notification message generated by the fourth generation module 1812 to the terminal device and the server, such that the server clears the new verification number and the new verification password of the smart device based on the notification message, and the terminal device clears a UUID of the smart device and the session random number based on the notification message.

As may be seen from the above embodiments, in the present disclosure, a terminal device is introduced, and dynamic update and management of a verification number and a verification password of a smart device is implemented by using an interaction mechanism between the smart device and a server, thus guaranteeing that the server may authenticate and authorize the smart device subsequently by using the updated verification number and verification password (the new verification number and the new verification password in the present disclosure), and increasing the difficulty in monitoring the verification number and the verification password during update. Meanwhile, the smart device may be effectively prevented from being masqueraded or attacked by other smart devices in the Internet of Things, thus further improving the security of the system.

Those skilled in the art may easily obtain other implementation solutions of the present disclosure after considering the specification and practicing the invention disclosed here. The present disclosure is intended to cover any variations, usages, or adaptive changes of the present disclosure, and these variations, usages or adaptive changes follow general principles of the present disclosure and include common general knowledge or conventional technical measures in this technical field that are not disclosed in the present disclosure. The specification and embodiments are considered as merely exemplary, and real scope and spirit of the present disclosure are defined by the following claims.

It should be further noted that, the term "include", "comprise" or other variations thereof are intended to cover non-exclusive inclusion, so that a process, method, commodity or device including a series of elements not only includes the elements, but also includes other elements not clearly listed, or further includes inherent elements of the process, method, commodity or device. Without more limitations, an element defined by "including a/an . . . " does not exclude that the process, method, commodity or device including the element further has other identical elements.

The above descriptions are merely preferred embodiments of the present disclosure, and are not intended to limit the present disclosure. Any modification, equivalent replacement and improvement made within the spirit and principle of the present disclosure shall fall within the protection scope of the present disclosure.

The present disclosure may further be understood with clauses as follows.

Clause 1. A verification information update method, applied to a server, comprising:

receiving a first request message for binding to a smart device from a terminal device, the first request message carrying a universally unique identifier (UUID) of the smart device;

determining a binding relationship between the UUID and a user identifier of the terminal device, and generating a session random number corresponding to the binding relationship; and generating a new verification number and a new verification password of the smart device based on the session random number.

Clause 2. The method of clause 1, further comprising:

returning the session random number to the terminal device, such that the smart device generates a new verification number and a new verification password of the smart device based on the session random number after the terminal device forwards the session random number to the smart device.

Clause 3. The method of clause 1, wherein the generating the new verification number and the new verification password of the smart device based on the session random number comprises:

determining an initial verification number and an initial verification password of the smart device;

generating the new verification number of the smart device based on the initial verification number and the session random number; and generating the new verification password of the smart device based on the initial verification password and the session random number.

Clause 4. The method of clause 1, further comprising:

receiving a second request message for registering on the server from the smart device, the second request message carrying identity information of the smart device and a first signature value of the smart device;

calculating a second signature value of the smart device based on an initial verification number and an initial verification password corresponding to the identity information;

generating the UUID for the smart device if the second signature value is identical to the first signature value; and returning the UUID to the smart device.

Clause 5. The method of clause 4, wherein the first signature value is calculated by the smart device applies a hash algorithm to a character string after the smart device ranks the initial verification number and the initial verification password of the smart device and forms the character string.

Clause 6. The method of any of clauses 1 to 5, further comprising:

receiving a notification message for resetting from the smart device; and clearing the new verification number and the new verification password of the smart device based on the notification message.

Clause 7. A verification information update method, applied to a terminal device, comprising:

sending a first request message for binding to a smart device to a server, the first request message carrying a universally unique identifier (UUID) of the smart device;

receiving a session random number generated by the server based on the first request message; and sending the session random number to the smart device, such that the smart device generates a new verification number and a new verification password of the smart device based on the session random number.

Clause 8. The method of clause 7, further comprising:

sending a third request message for establishing a connection with the smart device to the smart device, the third request message carrying a user account; and receiving the UUID of the smart device returned by the smart device based on the third request message after the smart device authenticates the user account.

Clause 9. The method of clause 7, wherein the sending the session random number to the smart device comprises:

sending the session random number to the smart device by using a point-to-point communication link established between a smart application and the smart device; or displaying the session random number on a user interface of the terminal device, such that a user input module of the smart device acquires the session random number input by the user.

Clause 10. The method of any of clauses 7 to 9, further comprising:

receiving a notification message for resetting from the smart device; and clearing the UUID of the smart device and the session random number based on the notification message.

Clause 11. A verification information update method, applied to a smart device, comprising:

receiving a session random number from a server forwarded by a terminal device; and generating a new verification number and a new verification password of the smart device based on the session random number.

Clause 12. The method of clause 11, further comprising:

sending to the server a second request message for registering on the server, the second request message carrying identity information of the smart device and a first signature value of the smart device; and receiving a universally unique identifier (UUID) of the smart device generated by the server based on the second request message.

Clause 13. The method of clause 11, wherein the generating the new verification number and the new verification password of the smart device based on the session random number comprises:

determining an initial verification number and an initial verification password of the smart device;

generating the new verification number of the smart device based on the initial verification number and the session random number; and generating the new verification password of the smart device based on the initial verification password and the session random number.

Clause 14. The method of any of clauses 11 to 13, further comprising:

generating a notification message after detecting that a button for resetting is triggered; and sending the notification message to the terminal device and the server, such that the server clears the new verification number and the new verification password of the smart device based on the notification message, and the terminal device clears the UUID of the smart device and the session random number based on the notification message.

Clause 15. A verification information update apparatus, applied to a server, comprising:

a first receiving module configured to receive a first request message for binding to a smart device from a terminal device, the first request message carrying a universally unique identifier (UUID) of the smart device;

a first determination module configured to determine a binding relationship between the UUID received by the first receiving module and a user identifier of the terminal device, and generate a session random number corresponding to the binding relationship; and a first generation module configured to generate a new verification number and a new verification password of the smart device based on the session random number determined by the first determination module.

Clause 16. The apparatus of clause 15, further comprising:

a first sending module configured to return the session random number determined by the first determination module to the terminal device, such that the smart device generates a new verification number and a new verification password of the smart device based on the session random number after the terminal device forwards the session random number to the smart device.

Clause 17. The apparatus of clause 15, wherein the first generation module comprises:

a first determination unit configured to determine an initial verification number and an initial verification password of the smart device;

a first generation unit configured to generate the new verification number of the smart device based on the initial verification number determined by the first determination unit and the session random number; and a second generation unit configured to generate the new verification password of the smart device based on the initial verification password determined by the first determination unit and the session random number.

Clause 18. The apparatus of clause 15, further comprising:

a second receiving module configured to receive a second request message for registering on the server from the smart device, the second request message carrying identity information of the smart device and a first signature value of the smart device;

a first calculation module configured to calculate a second signature value of the smart device based on an initial verification number and an initial verification password corresponding to the identity information carried in the second request message received by the second receiving module;

a second generation module configured to generate the UUID for the smart device if the second signature value calculated by the first calculation module is identical to the first signature value; and a second sending module configured to return the UUID generated by the second generation module to the smart device.

Clause 19. The apparatus of clause 18, wherein the first signature value is calculated by the smart device using a hash algorithm after the smart device ranks the initial verification number and the initial verification password of the smart device and forms a character string.

Clause 20. The apparatus of any of clauses 15 to 19, further comprising:

a third receiving module configured to receive a notification message for resetting from the smart device; and a first clearing module configured to clear the new verification number and the new verification password of the smart device based on the notification message received by the third receiving module.

Clause 21. A verification information update apparatus, applied to a terminal device, comprising:

a third sending module configured to send a first request message for binding to a smart device to a server, the first request message carrying a universally unique identifier (UUID) of the smart device;

a fourth receiving module configured to receive a session random number generated by the server based on the first request message sent by the third sending module; and a fourth sending module configured to send the session random number received by the fourth receiving module to the smart device, such that the smart device generates a new verification number and a new verification password of the smart device based on the session random number.

Clause 22. The apparatus of clause 21, further comprising:

a fifth sending module configured to send a third request message for establishing a connection with the smart device to the smart device, the third request message carrying a user account; and a fifth receiving module configured to receive the UUID of the smart device returned by the smart device based on the third request message after the smart device authenticates the user account carried in the third request message sent by the fifth sending module.

Clause 23. The apparatus of clause 21, wherein the fourth sending module comprises:

a sending unit configured to send the session random number to the smart device by using a point-to-point communication link established between a smart application and the smart device; or a display unit configured to display the session random number on a user interface of the terminal device, such that a user input module of the smart device inputs to acquire the session random number input by the user.

Clause 24. The apparatus of any of clauses 21 to 23, further comprising:

a sixth receiving module configured to receive a notification message for resetting from the smart device; and a second clearing module configured to clear the UUID of the smart device and the session random number based on the notification message received by the sixth receiving module.

Clause 25. A verification information update apparatus, applied to a smart device, comprising:

a seventh receiving module configured to receive a session random number from a server forwarded by a terminal device; and a third generation module configured to generate a new verification number and a new verification password of the smart device based on the session random number received by the seventh receiving module.

Clause 26. The apparatus of clause 25, further comprising:

a sixth sending module configured to send to the server a second request message for registering on the server, the second request message carrying identity information of the smart device and a first signature value of the smart device; and an eighth receiving module configured to receive a universally unique identifier (UUID) of the smart device generated by the server based on the second request message.

Clause 27. The apparatus of clause 25, wherein the third generation module comprises:

a second determination unit configured to determine an initial verification number and the initial verification password of the smart device;

a third generation unit configured to generate the new verification number of the smart device based on the initial verification number determined by the second determination unit and the session random number; and a fourth generation unit configured to generate the new verification password of the smart device based on the initial verification password determined by the second determination unit and the session random number.

Clause 28. The apparatus of any of clauses 25 to 27, further comprising:

a fourth generation module configured to generate a notification message after it is detected that a button for resetting is triggered; and a seventh sending module configured to send the notification message generated by the fourth generation module to the terminal device and the server, such that the server clears the new verification number and the new verification password of the smart device based on the notification message, and the terminal device clears the UUID of the smart device and the session random number based on the notification message.

What is claimed is:

1. A method performed by a server, the method comprising:
   receiving a first request message for binding to a first device from a second device, the first request message carrying a unique identifier of the first device;
   determining a binding relationship between the unique identifier of the first device and a user identifier of the second device;
   generating a session random number corresponding to the binding relationship; pre-assigning, by hardware writing, an initial verification number and an initial verification password of the first device;
   generating a new verification number of the first device based on the initial verification number and the session random number; and
   generating a new verification password of the first device based on the initial verification password and the session random number.

2. The method of claim 1, wherein the first device includes a smart device.

3. The method of claim 1, wherein the second device includes a terminal device.

4. The method of claim 1, wherein the unique identifier of the first device includes a universally unique identifier (UUID) of the first device.

5. The method of claim 1, further comprising:
   returning the session random number to the second device to forward the session random number to the first device to request the first device to generate the new verification number and the new verification password of the first device based on the session random number.

6. The method of claim 1, further comprising:
   receiving a second request message for registering on a server from the first device, the second request message carrying identity information of the first device and a first signature value of the first device;
   calculating a second signature value of the first device based on an initial verification number and an initial verification password corresponding to the identity information;
   generating the unique identifier for the first device in response to determining that the second signature value is identical to the first signature value; and
   returning the unique identifier to the first device.

7. The method of claim 6, wherein the first signature value is calculated by the first device that applies a hash algorithm to a character string after the first device ranks an initial verification number and an initial verification password of the first device and forms the character string.

8. The method of claim 1, further comprising:
   receiving a notification message for resetting from the first device; and
   clearing the new verification number and the new verification password of the first device based on the notification message.

9. A method comprising:
   sending, to a server, a first request message for binding to a first device from a second device, the first request message carrying a unique identifier of the first device;
   receiving, by the second device, a session random number generated by the server based on the unique identifier of the first device;
   sending, by the second device, the session random number to the first device; and
   requesting, by the second device, the first device to generate, based on the session random number, a new verification number of the first device and a new verification password of the first device,
   wherein, for authenticating the first device to the server, the new verification number generated by the first device and the new verification password generated by the first device are respectively compared to a new verification number of the first device generated by the server based on an initial verification number and the session random number and a new verification password of the first device generated by the server based on an initial verification password and the session random number, the initial verification number and the initial verification password being pre-assigned by the server via hardware writing.

10. The method of claim 9, wherein the first device includes a smart device.

11. The method of claim 9, wherein the unique identifier of the first device includes a universally unique identifier (UUID) of the first device.

12. The method of claim 9, further comprising:
    sending a third request message for establishing a connection with the first device to the first device, the third request message carrying a user account; and
    receiving the unique identifier of the first device returned by the first device based on the third request message after the user account is authenticated.

13. The method of claim 9, wherein the sending the session random number to the first device comprises:
    sending the session random number to the first device by using a point-to-point communication link established with the first device.

14. The method of claim 9, wherein the sending the session random number to the first device comprises:
    displaying the session random number on a user interface of a second device to be input to the first device.

15. A method comprising:
    receiving, by a server, a first request message for binding to a first device from a second device, the first request message carrying a unique identifier of the first device;
    determining, by the server, a binding relationship between the unique identifier of the first device and a user identifier of the second device;
    generating, by the server, a session random number corresponding to the binding relationship;

pre-assigning via hardware writing, by the server, an initial verification number and an initial verification password of the first device;

generating, by the server, a new verification number of the first device based on the initial verification number and the session random number;

generating, by the server, a new verification password of the first device based on the initial verification password and the session random number;

receiving, by the first device, the session random number from the server forwarded by the second device; and generating, by the first device, a new verification number of the first device based on the session random number and a new verification password of the first device based on the session random number, wherein the new verification number and the new verification password generated by the server are compared respectively to the new verification number and the new verification password generated by the first device.

16. The method of claim 15, wherein:
the first device includes a smart device; and
the second device includes a terminal device.

17. The method of claim 15, further comprising:
sending, from the first device to the server, a second request message for registering on the server, the second request message carrying identity information of the first device and a first signature value of the first device; and
receiving, by the first device, a unique identifier of the first device generated by the server based on the second request message.

* * * * *